US010120489B2

(12) United States Patent
Guard et al.

(10) Patent No.: US 10,120,489 B2
(45) Date of Patent: Nov. 6, 2018

(54) TOUCH SENSOR MESH DESIGNS

(71) Applicant: Atmel Corporation, San Jose, CA (US)

(72) Inventors: David Brent Guard, Southampton (GB); Steven P. Emm, Southampton (GB); James Lyle, Morgan Hill, CA (US)

(73) Assignee: Atmel Corporation, Chandler, AZ (US)

(*) Notice: Subject to any disclaimer, the term of this patent is extended or adjusted under 35 U.S.C. 154(b) by 155 days.

(21) Appl. No.: 15/209,388

(22) Filed: Jul. 13, 2016

(65) Prior Publication Data
US 2017/0315656 A1     Nov. 2, 2017

Related U.S. Application Data

(60) Provisional application No. 62/328,924, filed on Apr. 28, 2016.

(51) Int. Cl.
G06F 3/041    (2006.01)
G06F 3/044    (2006.01)

(52) U.S. Cl.
CPC ............ *G06F 3/0416* (2013.01); *G06F 3/044* (2013.01); *G06F 3/0412* (2013.01); *G06F 2203/04103* (2013.01); *G06F 2203/04112* (2013.01)

(58) Field of Classification Search
CPC ............................................ G06F 2203/04112
See application file for complete search history.

(56) References Cited

U.S. PATENT DOCUMENTS

| | | |
|---|---|---|
| 7,663,607 B2 | 2/2010 | Hotelling |
| 7,864,503 B2 | 1/2011 | Chang |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 8,217,902 B2 | 7/2012 | Chang |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Amr Awad
*Assistant Examiner* — Stephen Bray
(74) *Attorney, Agent, or Firm* — Baker Botts L.L.P.

(57) ABSTRACT

In one embodiment, a touch sensor includes a substrate and a mesh of conductive material formed on the substrate and configured to extend across a display. The mesh includes first lines of conductive material that are substantially parallel to each other. The first lines extend across at least a portion of the display at a first angle relative to a first axis. The first lines are separated from each other along the first axis by a sequence of separation distances having corresponding magnitudes, where magnitudes of more than one separation distance from among the sequence of separation distances are based on a phasor step θ and a phasor magnitude of at least one phasor.

17 Claims, 13 Drawing Sheets

(56) References Cited

U.S. PATENT DOCUMENTS

| | | |
|---|---|---|
| 8,723,824 B2 | 5/2014 | Myers |
| 8,947,391 B1 * | 2/2015 | Guard .................... G06F 3/044 |
| | | 178/18.05 |
| 2008/0309635 A1 | 12/2008 | Matsuo |
| 2009/0315854 A1 | 12/2009 | Matsuo |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2014/0293154 A1 * | 10/2014 | Philipp .................. G06F 3/044 |
| | | 349/12 |
| 2016/0266460 A1 * | 9/2016 | Kloeppner ............ G02F 1/1533 |

\* cited by examiner

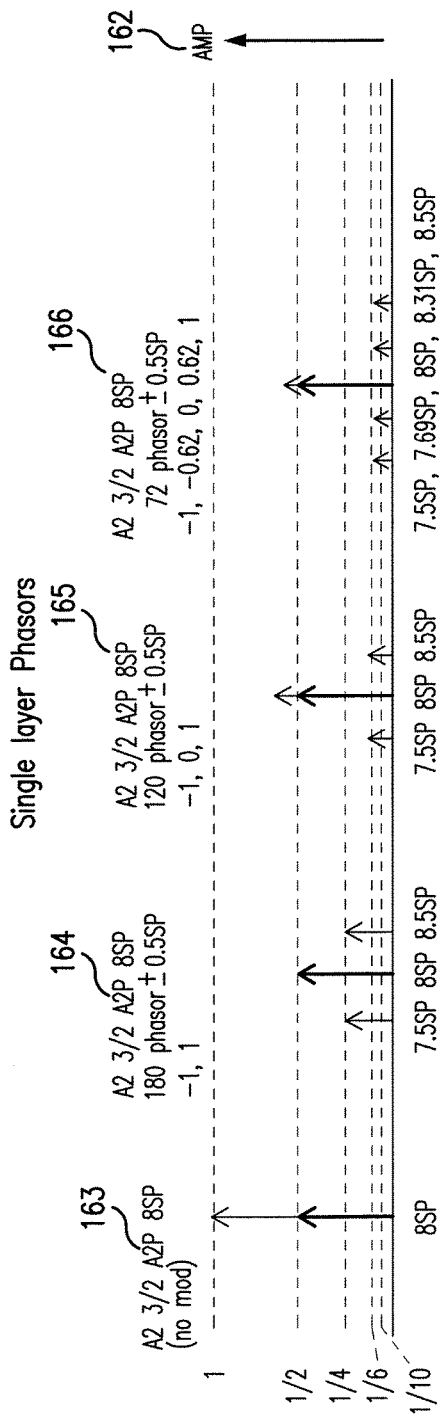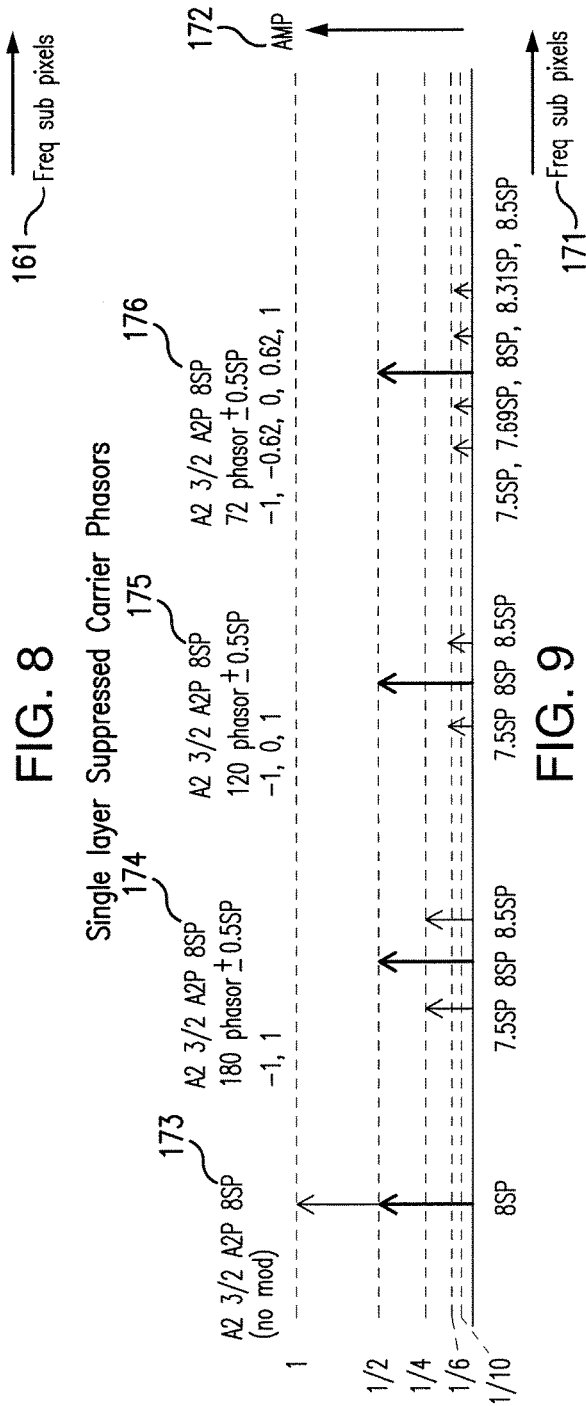

TOUCH SENSOR MESH DESIGNS

RELATED APPLICATIONS

This application claims priority under 35 U.S.C. § 119(e) to U.S. Provisional Patent Application No. 62/328,924, filed Apr. 28, 2016 and entitled "TOUCH SENSOR MESH DESIGNS," which is incorporated by reference.

TECHNICAL FIELD

This disclosure generally relates to touch sensors.

BACKGROUND

According to an example scenario, a touch sensor detects the presence and position of an object (e.g., a user's finger or a stylus) within a touch-sensitive area of touch sensor array overlaid on a display screen, for example. In a touch-sensitive-display application, a touch sensor array allows a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other device. A control panel on a household or other appliance may include a touch sensor.

There are a number of different types of touch sensors, such as for example resistive touch sensors, surface acoustic wave touch sensors, and capacitive touch sensors. In one example, when an object physically touches a touch screen within a touch sensitive area of a touch sensor of the touch screen (e.g., by physically touching a cover layer overlaying a touch sensor array of the touch sensor) or comes within a detection distance of the touch sensor (e.g., by hovering above the cover layer overlaying the touch sensor array of the touch sensor), a change in capacitance may occur within the touch screen at a position of the touch sensor of the touch screen that corresponds to the position of the object within the touch sensitive area of the touch sensor. A touch sensor controller processes the change in capacitance to determine the position of the change of capacitance within the touch sensor (e.g., within a touch sensor array of the touch sensor).

BRIEF DESCRIPTION OF THE DRAWINGS

FIG. 8 illustrates examples of frequency distributions achieved using single layer modulation with various example phasors, according to an embodiment of the present disclosure.

FIG. 9 illustrates examples of frequency distributions achieved using single layer modulation with various example phasors and suppressed carriers, according to an embodiment of the present disclosure.

DESCRIPTION OF EXAMPLE EMBODIMENTS

Figure 1A:
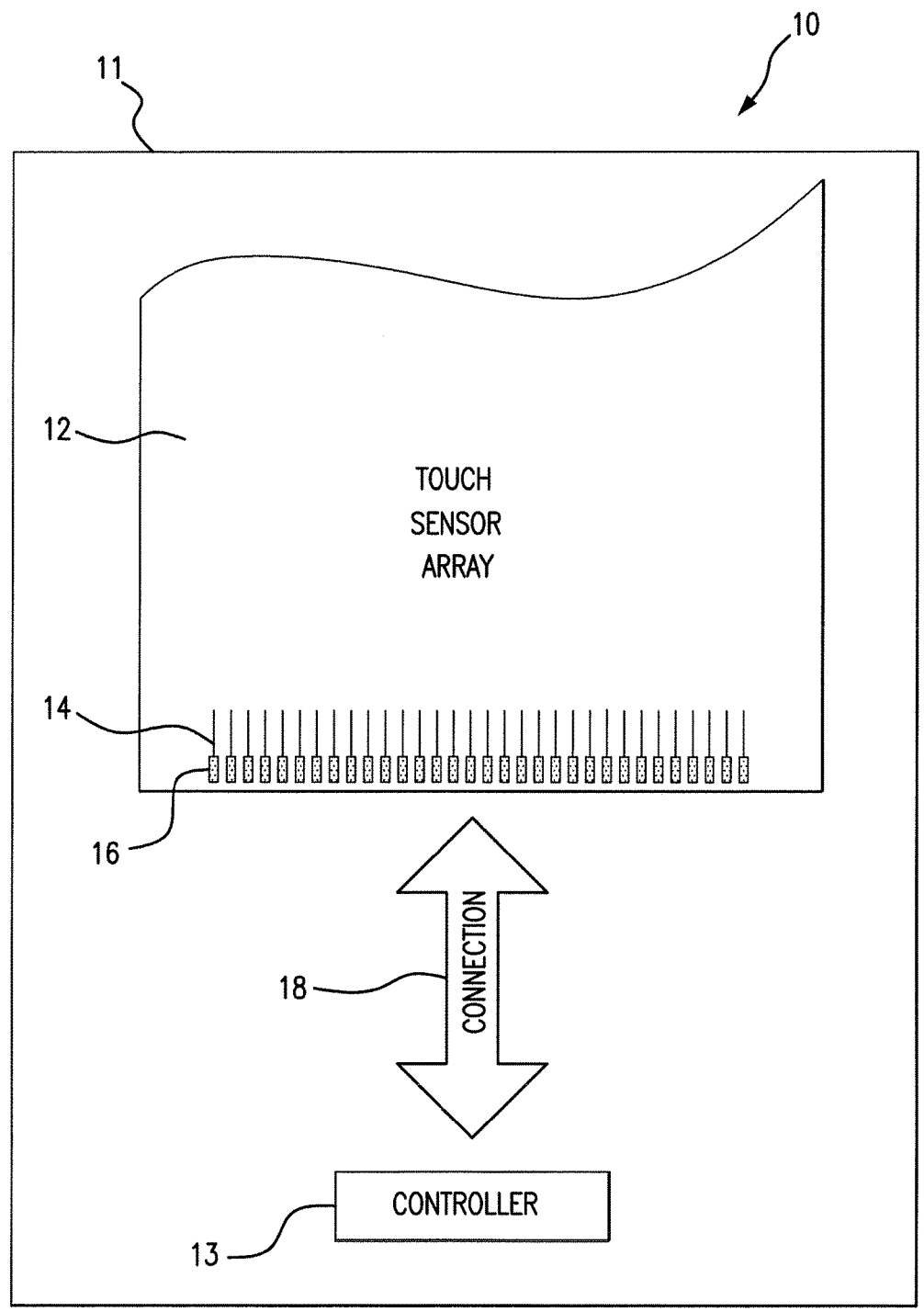
FIG. 1A illustrates an example touch sensor with an example touch-sensor controller, according to an embodiment of the present disclosure.

An embodiment of the present disclosure is directed to reducing or eliminating the appearance of one or more moiré-pattern effects resulting from the optical interaction of mesh pattern touch sensors and optical display devices. In one example, a moiré pattern refers to a secondary and visually evident superimposed pattern that can result from a touch-sensor repeated/periodic mesh pattern being overlaid over a repeating pixel pattern of a display. The appearance of a moiré-pattern effect may be caused by one or more features of a touch sensor that cause perceivable differences in the intensity of light and color from the display.

In one example, a touch-sensor mesh pattern, at least in part, changes the intensity of perceivable light and color of a display and thereby causes a moiré-pattern effect to appear when the touch sensor and display are used in combination. More specifically, a mesh pattern including a repeating pattern of conductive lines that are superimposed onto a repeating pattern of pixels or sub-pixels of the display (as shown, for example, in FIG. 4), and, in one example, the superimposition of the mesh pattern on the display results in various conductive lines of the mesh pattern passing over and/or through at least some portion of one or more sub-pixels of the display. The superimposition of conductive lines, including opaque or semi-opaque materials for example, over the display elements can obstruct or occlude light from the pixels beneath the conductive lines. When the mesh pattern and the pixels of the display are constructed according to regular patterns, for example, the pattern of obstructed light caused by the conductive lines can result in a visible and/or noticeable pattern to a user viewing the display. To illustrate, particular pixels or sub-pixels may be intersected by longer and/or shorter sections of the conductive lines, which can result in particular pixels or sub-pixels intersected by shorter lengths of conductive lines resulting in less occlusion (i.e., the pixel or sub-pixel will be brighter), while other pixels or sub-pixels are intersected by longer sections of the conductive lines resulting in more occlusion (i.e., the pixels or sub-pixels will be dimmer). and while other pixels or sub-pixels are not intersected by a conductive line at all and thus are not occluded. In one example, the repeating nature of conductive lines and pixels results in particular frequencies associated with the pixels having similar occlusion levels.

An embodiment of the present disclosure recognizes that the naked eye is capable of discerning particular low frequency moiré patterns better than high frequency moiré patterns. An embodiment of the present disclosure relates to construction of the mesh pattern and alignment of the mesh pattern with the underlying display elements (e.g., pixels and sub-pixels) such that low frequency moiré effects are reduced or eliminated.

In one example, integration of sub pixel colors occurs at frequencies sufficiently high that the naked eye has difficulty distinguishing (the eye is an integrator itself). Mesh pitches which afford the fastest possible integration periods may be unstable with regard to particular manufacturing tolerances. For example, particular manufacturing processes have tolerances that result in, for example, a mesh pattern that departs in some way from the design and/or is not precisely aligned with the pixels and/or sub-pixels of the underlying display. These manufacturing processes can introduce systemic errors that result in low-frequency patterns, thus resulting in a manufactured product that departs from the intended design in a way that introduces low frequency moiré patterns.

An embodiment of the present disclosure relates to designing mesh patterns that account for variance in manufacturing tolerances and yet still reduce or eliminate the frequency moiré patterns while preserving optical performance. In an embodiment of the present disclosure, a phasor modulation pattern is applied to a pitch of at least one of the sets of conductive lines in the mesh pattern of the touch sensor. In one example, modulation of the first of the sets of conductive lines allows attenuation of low frequency moiré patterns, thus stabilizing the geometry instability that may be introduced in the manufacturing process. This modulation may allow for other sets of the conductive lines to remain unmodulated and thereby remain in phase with the pixels of the display. In an embodiment, these techniques allow for improved color integration and mitigation of low frequency moiré patterns.

In one embodiment, a touch sensor includes a substrate and a mesh of conductive material formed on the substrate and configured to extend across a display. The mesh includes first lines of conductive material that are substantially parallel to each other. The first lines extend across at least a portion of the display at a first angle relative to a first axis. The first lines are separated from each other along the first axis by a sequence of separation distances having corresponding magnitudes, where magnitudes of more than one separation distance from among the sequence of separation distances are based on a phasor step θ and a phasor magnitude of at least one phasor.

FIG. 1A illustrates an example system 10 that includes a touch sensor 11, according to an embodiment of the present disclosure. Touch sensor 11 includes touch sensor array 12 and touch sensor controller 13. Touch sensor array 12 and touch sensor controller 13 detect the presence and position of a touch or the proximity of an object within a touch-sensitive area of touch sensor array 12.

Touch sensor array 12 includes one or more touch-sensitive areas. In one embodiment, touch sensor array 12 includes an array of electrodes disposed on one or more substrates, wherein one or more of such substrates may be made of a dielectric material.

In one embodiment, an electrode is an area of conductive material forming a shape, such as for example a disc, square, rectangle, thin line, other shape, or a combination of these shapes. One or more cuts in one or more layers of conductive material (at least in part) create the shape of an electrode, and the area of the shape is (at least in part) bounded by those cuts. In one embodiment, the conductive material of an electrode occupies approximately 100% of the area of its shape. For example, an electrode may be made of indium tin oxide (ITO) and the ITO of the electrode can occupy approximately 100% of the area of its shape (sometimes referred to as 100% fill). In one embodiment, the conductive material of an electrode occupies less than 100% of the area of its shape. For example, an electrode may be made of fine lines of metal or other conductive material (FLM), such as for example copper, silver, or a copper- or silver-based material, and the fine lines of conductive material may occupy approximately 5% of the area of its shape in a hatched, mesh, or other pattern. Reference to FLM encompasses such material. Although this disclosure describes or illustrates particular electrodes made of particular conductive material forming particular shapes with particular fill percentages having particular patterns, this disclosure contemplates, in any combination, electrodes made of other conductive materials forming other shapes with other fill percentages having other patterns.

The shapes of the electrodes (or other elements) of a touch sensor array 12 constitute, in whole or in part, one or more macro-features of touch sensor array 12. One or more characteristics of the implementation of those shapes (such as, for example, the conductive materials, fills, or patterns within the shapes) constitute in whole or in part one or more micro-features of touch sensor array 12. In an embodiment, one or more macro-features of a touch sensor array 12 determine one or more characteristics of its functionality, and one or more micro-features of touch sensor array 12 determine one or more optical features of touch sensor array 12, such as transmittance, refraction, or reflection.

Although this disclosure describes a number of example electrodes, the present disclosure is not limited to these example electrodes and other electrodes can be implemented. Additionally, although this disclosure describes a number of example embodiments that include particular configurations of particular electrodes forming particular nodes, the present disclosure is not limited to these example embodiments and other configurations can be implemented. In one embodiment, a number of electrodes are disposed on the same or different surfaces of the same substrate. Additionally or alternatively, different electrodes may be disposed on different substrates. Although this disclosure describes a number of example embodiments that include particular electrodes arranged in specific, example patterns, the present disclosure is not limited to these example patterns and other electrode patterns can be implemented.

A mechanical stack contains the substrate (or multiple substrates) and the conductive material forming the electrodes of touch sensor array 12. For example, in an embodiment, the mechanical stack includes a first layer of optically clear adhesive (OCA) beneath a cover panel. The cover panel is, for example, clear (or substantially clear) and made of a resilient material for repeated touching, such as for example glass, polycarbonate, or poly (methyl methacrylate) (PMMA). This disclosure contemplates a cover panel being made of any clear, or substantially clear, material. In an embodiment, the first layer of OCA is disposed between the cover panel and the substrate with the conductive material forming the electrodes. The mechanical stack also includes, for example, a second layer of OCA and a dielectric layer (which is made of PET or another material, similar to the substrate with the conductive material forming the electrodes). As an alternative, a thin coating of a dielectric material may be applied instead of the second layer of OCA and the dielectric layer. The second layer of OCA in an embodiment is disposed between the substrate with the conductive material making up the electrodes and the dielectric layer, and the dielectric layer is disposed between the second layer of OCA and an air gap to a display of a device including touch sensor array 12 and touch sensor controller 13. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm.

Although this disclosure describes a particular mechanical stack with a particular number of particular layers made of particular materials and having particular thicknesses, this disclosure contemplates other mechanical stacks with any number of layers made of any materials and having any thicknesses. For example, in one embodiment, a layer of adhesive or dielectric replaces the dielectric layer, second layer of OCA, and air gap described above, with there being no air gap in the display.

In an embodiment, one or more portions of the substrate of touch sensor array 12 is made of polyethylene terephthalate (PET) or another material. This disclosure contemplates any substrate with portions made of any material(s). In one embodiment, one or more electrodes in touch sensor array 12 are made of ITO in whole or in part. Additionally or alternatively, one or more electrodes in touch sensor array 12 are made of fine lines of metal or other conductive material. For example, one or more portions of the conductive material may be copper or copper-based and have a thickness of approximately 5 microns ($\mu m$) or less and a width of approximately 10 $\mu m$ or less. As another example, one or more portions of the conductive material may be silver or silver-based and similarly have a thickness of approximately 5 $\mu m$ or less and a width of approximately 10 $\mu m$ or less. This disclosure contemplates any electrodes made of any electrically-conductive materials.

In one embodiment, touch sensor array 12 implements a capacitive form of touch sensing. In a mutual-capacitance implementation, touch sensor array 12 includes, for example, an array of drive and sense electrodes forming an array of capacitive nodes. A drive electrode and a sense electrode form a capacitive node. The drive and sense electrodes forming the capacitive node are positioned near each other but do not make electrical contact with each other. Instead, in response to a signal being applied to the drive electrodes for example, the drive and sense electrodes capacitively couple to each other across a space between them. A pulsed or alternating voltage applied to the drive electrode (by touch sensor controller 13) induces a charge on the sense electrode, and the amount of charge induced is susceptible to external influence (such as a touch or the proximity of an object). When an object touches or comes within proximity of the capacitive node, a change in capacitance occurs at the capacitive node and touch sensor controller 13 measures the change in capacitance. By measuring changes in capacitance throughout the array, touch sensor controller 13 determines the position of the touch or proximity within touch-sensitive areas of touch sensor array 12.

In a self-capacitance implementation, touch sensor array 12 includes, for example, an array of electrodes of a single type that may each form a capacitive node. When an object touches or comes within proximity of the capacitive node, a change in self-capacitance may occur at the capacitive node and touch sensor controller 13 measures the change in capacitance, for example, as a change in the amount of charge implemented to raise the voltage at the capacitive node by a predetermined amount. As with a mutual-capacitance implementation, by measuring changes in capacitance throughout the array, touch sensor controller 13 determines the position of the touch or proximity within touch-sensitive areas of touch sensor array 12. This disclosure contemplates any form of capacitive touch sensing.

In one embodiment, one or more drive electrodes together form a drive line running horizontally or vertically or in other orientations. Similarly, in one embodiment, one or more sense electrodes together form a sense line running horizontally or vertically or in other orientations. As one particular example, drive lines run substantially perpendicular to the sense lines. Reference to a drive line may encompass one or more drive electrodes making up the drive line, and vice versa. Reference to a sense line encompasses, for example, one or more sense electrodes making up the sense line, and vice versa.

In one embodiment, touch sensor array 12 includes drive and sense electrodes disposed in a pattern on one side of a single substrate. In such a configuration, a pair of drive and sense electrodes capacitively coupled to each other across a space between them form a capacitive node. As an example self-capacitance implementation, electrodes of a single type are disposed in a pattern on a single substrate. In addition or as an alternative to having drive and sense electrodes disposed in a pattern on one side of a single substrate, touch sensor array 12 may have drive electrodes disposed in a pattern on one side of a substrate and sense electrodes disposed in a pattern on another side of the substrate. Moreover, touch sensor array 12 may have drive electrodes disposed in a pattern on one side of one substrate and sense electrodes disposed in a pattern on one side of another substrate. In such configurations, an intersection of a drive electrode and a sense electrode forms a capacitive node. Such an intersection is a position where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates other configurations of electrodes forming nodes. Moreover, this disclosure contemplates other electrodes disposed on any number of substrates in any patterns.

As described above, in an embodiment, a change in capacitance at a capacitive node of touch sensor array 12 indicates a touch or proximity input at the position of the capacitive node. Touch sensor controller 13 detects and processes the change in capacitance to determine the presence and position of the touch or proximity input. In one embodiment, touch sensor controller 13 then communicates information about the touch or proximity input to one or more other components (such as one or more central processing units (CPUs)) of a device that includes touch sensor array 12 and touch sensor controller 13, which responds to the touch or proximity input by initiating a function of the device (or an application running on the device). Although this disclosure describes a particular touch sensor controller 13 having particular functionality with respect to a particular device and a particular touch sensor 11, this disclosure contemplates other touch sensor controllers having any functionality with respect to any device and any touch sensor.

In one embodiment, touch sensor controller 13 is implemented as one or more integrated circuits (ICs), such as for example general-purpose microprocessors, microcontrollers, programmable logic devices or arrays, application-specific ICs (ASICs). Touch sensor controller 13 includes any combination of analog circuitry, digital logic, and digital non-volatile memory. In one embodiment, touch sensor controller 13 is disposed on a flexible printed circuit (FPC) bonded to the substrate of touch sensor array 12, as described below. The FPC is active or passive. In one embodiment, multiple touch sensor controllers 13 are disposed on the FPC.

In an example implementation, touch sensor controller 13 includes a processor unit, a drive unit, a sense unit, and a storage unit. In such an implementation, the drive unit supplies drive signals to the drive electrodes of touch sensor array 12, and the sense unit senses charge at the capacitive nodes of touch sensor array 12 and provides measurement signals to the processor unit representing capacitances at the capacitive nodes. The processor unit controls the supply of drive signals to the drive electrodes by the drive unit and processes measurement signals from the sense unit to detect and process the presence and position of a touch or proximity input within touch-sensitive areas of touch sensor array 12. In an embodiment, the processor unit also tracks changes in the position of a touch or proximity input within touch-sensitive areas of touch sensor array 12. The storage unit stores programming for execution by the processor unit, including programming for controlling the drive unit to supply drive signals to the drive electrodes, programming for processing measurement signals from the sense unit, and other programming. Although this disclosure describes a particular touch sensor controller 13 having a particular implementation with particular components, this disclosure contemplates touch sensor controller having other implementations with other components.

Tracks 14 of conductive material disposed on the substrate of touch sensor array 12 couple the drive or sense electrodes of touch sensor array 12 to connection pads 16, also disposed on the substrate of touch sensor array 12. As described below, connection pads 16 facilitate coupling of tracks 14 to touch sensor controller 13. Tracks 14 extend into or around (e.g., at the edges of) touch-sensitive areas of touch sensor array 12. In one embodiment, particular tracks 14 provide drive connections for coupling touch sensor controller 13 to drive electrodes of touch sensor array 12, through which the drive unit of touch sensor controller 13 supplies drive signals to the drive electrodes, and other tracks 14 provide sense connections for coupling touch sensor controller 13 to sense electrodes of touch sensor array 12, through which the sense unit of touch sensor controller 13 senses charge at the capacitive nodes of touch sensor array 12.

Tracks 14 are made of fine lines of metal or other conductive material. For example, the conductive material of tracks 14 may be copper or copper-based and have a width of approximately 100 µm or less. As another example, the conductive material of tracks 14 may be silver or silver-based and have a width of approximately 100 µm or less. In one embodiment, tracks 14 are made of ITO in whole or in part in addition or as an alternative to the fine lines of metal or other conductive material. Although this disclosure describes particular tracks made of particular materials with particular widths, this disclosure contemplates tracks made of other materials and/or other widths. In addition to tracks 14, in an embodiment, touch sensor array 12 includes one or more ground lines terminating at a ground connector (which can be a connection pad 16) at an edge of the substrate of touch sensor array 12 (similar to tracks 14).

Connection pads 16, in an embodiment, are located along one or more edges of the substrate, outside a touch-sensitive area of touch sensor array 12. As described above, in an embodiment, touch sensor controller 13 is on an FPC. Connection pads 16 are, for example, made of the same material as tracks 14 and are bonded to the FPC using an anisotropic conductive film (ACF). In one embodiment, connection 18 includes conductive lines on the FPC coupling touch sensor controller 13 to connection pads 16, in turn coupling touch sensor controller 13 to tracks 14 and to the drive or sense electrodes of touch sensor array 12. In another embodiment, connection pads 16 are connected to an electro-mechanical connector (such as, for example, a zero insertion force wire-to-board connector). Connection 18 can include an FPC. This disclosure contemplates any connection 18 between touch sensor controller 13 and touch sensor array 12.

Figure 1B:
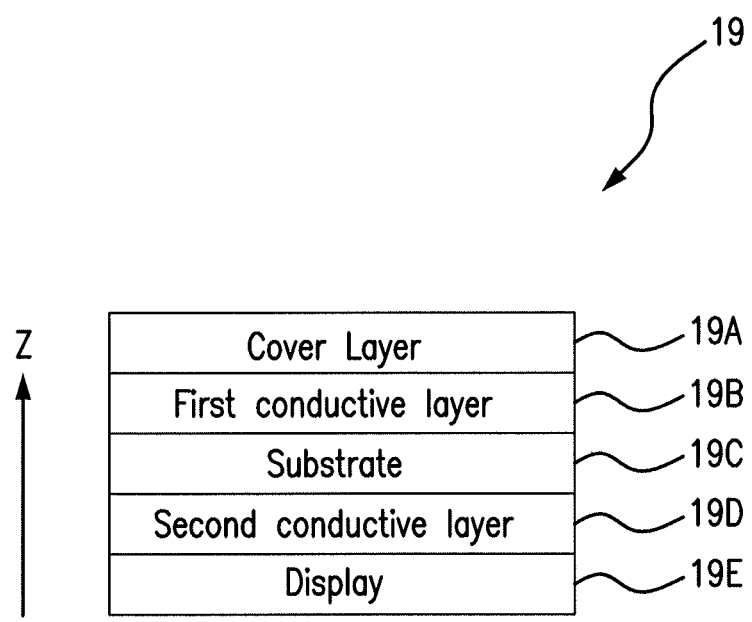
FIG. 1B illustrates an example dual-layer mechanical stack 19 for a touch sensor 11, according to an embodiment of the present disclosure.

FIG. 1B illustrates an example dual-layer mechanical stack 19 for a touch sensor 11, according to an embodiment of the present disclosure. In the example embodiment of FIG. 1B, the mechanical stack 19 includes multiple layers and is illustrated as positioned with respect to a z-axis. The example mechanical stack 19 includes a display 19E (e.g., a display portion 20 of FIG. 2), a second conductive layer 19D, a substrate 19C, a first conductive layer 19B, and a cover layer 19A. In an embodiment, the second conductive layer 19D and first conductive layer 19B are drive and sense electrodes, respectively, as discussed above in connection with FIG. 1A. In an embodiment, the second conductive layer 19D and first conductive layer 19B are meshes (of, for example, conductive lines) as described in this disclosure. In an embodiment, the second conductive layer 19D and first conductive layer 19B are conductive lines (e.g., conductive lines 50 and 52). Substrate 19C includes, in an embodiment, a material which electrically isolates the first and second conductive layers. In an embodiment, substrate 19C provides mechanical support for other layers. In an embodiment, additional layers of substrate (which, for example, may not be the same material as substrate 19C) may be used in different configurations. For example, a second substrate layer may be located between second conductive layer 19D and display 19E. The display 19E provides display information to be viewed by a user. Cover layer 19A may be clear, or substantially clear, and made of a resilient material for repeated touching, such as for example glass, polycarbonate, or poly(methyl methacrylate) (PMMA). In an embodiment, a transparent or semi-transparent adhesive layer is placed between cover layer 19A and first conductive layer 19B, and/or between second conductive layer 19D and display 19E. A user may interact with touch sensor 11 by touching cover layer 19A using a finger or some other touch object (such as a stylus). A user may also interact with touch sensor 11 by hovering a finger or some other touch object over cover layer 19A without actually making physical contact with cover layer 19A. In the example embodiment of FIG. 1B, mechanical stack 19 comprises two conductive layers forming, for example, a dual-layer mesh. In an embodiment, mechanical stack 19 may comprise a single conductive layer forming, for example, a single-layer mesh. Other embodiments of mechanical stack 19 may implement other configurations, relations, and perspectives, as well as fewer or additional layers.

In an embodiment, mechanical stack 19 comprises a combination of conductive mesh and ITO layers, where, for example, one of first conductive layer 19B and second conductive layer 19D is a conductive layer mesh, and the other is ITO. In this embodiment, the conductive layer mesh acts as a single-layer mesh, and, in an embodiment, the ITO layer may transmit and/or receive signals. In this embodiment, only one layer, for example the conductive mesh layer, may be modulated according to this disclosure (as discussed in more detail below).

Figure 2:
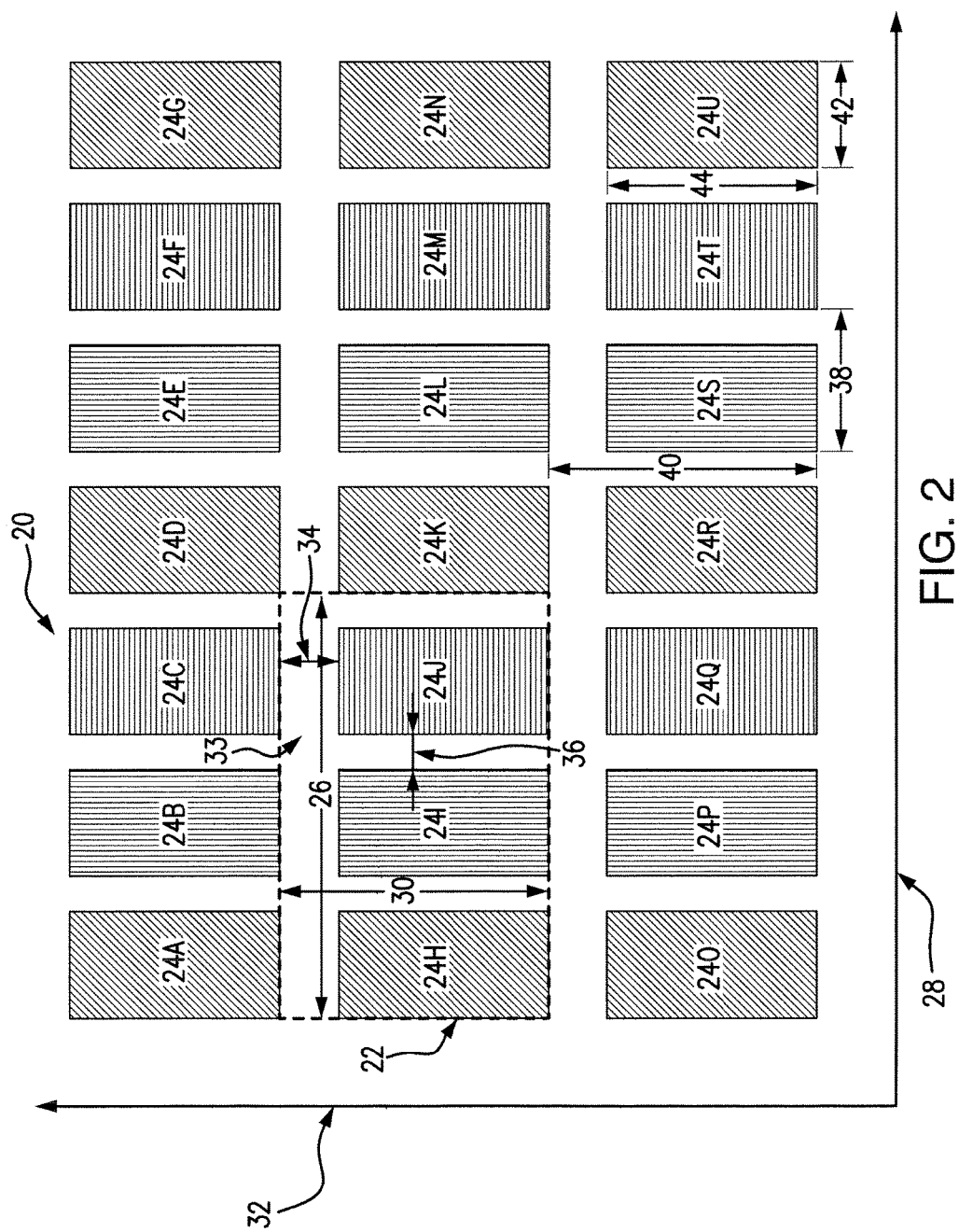
FIG. 2 illustrates an example portion of an example display that includes example pixels and sub-pixels, according to an embodiment of the present disclosure.

FIG. 2 illustrates an example portion 20 of an example display that includes example pixels 22 and sub-pixels 24, according to an embodiment of the present disclosure. In one embodiment, a touch sensor is overlaid on the display to implement a touch-sensitive display device. As an example, the display underneath the touch sensor may be a liquid crystal display (LCD), a light-emitting diode (LED) display, an organic LED display, an LED backlight LCD, an electrophoretic display, a plasma display, or other display. Although this disclosure describes and illustrates particular display types, this disclosure contemplates any other display types.

Portion 20 includes an array of pixels 22. In the example of FIG. 2, each pixel 22 includes three sub-pixels 24. In an embodiment, each sub-pixel 24 corresponds to a particular color, such as for example red, green, or blue. For example, each sub-pixel is configured to emit light having a wavelength associated with a particular color. The area of a pixel 22 (which may include dead space as described below) is indicated by the dashed-line border that encompasses sub-pixels 24H, 24I, and 24J in FIG. 2, where each sub-pixel corresponds, in one example, to the color red, green, or blue, respectively. The combined output of sub-pixels 24 determines the color and intensity of each pixel 22. Although this disclosure describes and illustrates example pixels 22 with a particular number of sub-pixels 24 having particular colors, this disclosure contemplates other pixels with other numbers of sub-pixels having other colors.

In an embodiment, pixels 22 and sub-pixels 24 are arranged in a repeating pattern along a horizontal axis 28 and a vertical axis 32 that are substantially perpendicular to each other. In one example, horizontal axis 28 is referred to as an x-axis or a first axis, and vertical axis 32 is referred to as a y-axis or a second axis. Although this disclosure describes and illustrates horizontal and vertical axes, this disclosure contemplates other axes having other orientations. Moreover, although this disclosure describes and illustrates particular axes having particular orientations relative to one another, this disclosure contemplates other axes having other orientations relative to one another.

Each pixel 22 has a horizontal pixel pitch 26, which in an embodiment is defined as the distance between corresponding features of two adjacent pixels 22 along horizontal axis 28 (such as the distance from the left edge of sub-pixel 24H to the left edge of sub-pixel 24K). Each pixel 22 also has a vertical pixel pitch 30, which in an embodiment is defined as the distance between corresponding features of two adjacent pixels 22 or two adjacent sub-pixels 24 along vertical axis 32 (such as the distance from the lower edge of sub-pixel 24I to the lower edge of sub-pixel 24B). In one example, horizontal pixel pitch 26 is referred to as HPP or $PP_x$, and vertical pixel pitch 30 is referred to as VPP or $PP_y$. In an embodiment, horizontal pixel pitch 26 is referred to as a pixel width or the width of pixel 22, and vertical pixel pitch 30 is referred to as a pixel height or the height of pixel 22. This disclosure contemplates any pixels with any horizontal and vertical pixel pitches having any values.

In the example illustrated in FIG. 2, sub-pixel 24 has a substantially rectangular shape. The present disclosure contemplates sub-pixel 24 having other shapes, including but not limited to square, round, oval, or chevron-shaped. In an embodiment, horizontal pixel pitch 26 is approximately 50 µm, 100 µm, 150 µm, 200 µm, 250 µm, 300 µm, or any dimension. In an embodiment, vertical pixel pitch 30 is approximately 50 µm, 100 µm, 150 µm, 200 µm, 250 µm, 300 µm, or any dimension. In one example, horizontal pixel pitch 26 is approximately the same as vertical pixel pitch 30, and pixel 22 has a substantially square shape. In one example, pixel 22 having a substantially square shape refers to horizontal pixel pitch 26 and vertical pixel pitch 26 having approximately the same dimension to within 1%, 2%, 5%, or to within any other percentage. As an example, a display may include pixels 22 with horizontal pixel pitch 26 and vertical pixel pitch 30 equal to 100 µm±1%, and pixels 22 may have a square shape with a 100-µm±1-µm height and a 100-µm±1-µm width. As another example, a display may have pixels 22 with horizontal pixel pitch 26 and vertical pixel pitch 30 approximately equal to 250 µm±2%, and pixels 22 may have a square shape with a height and width of 250 µm±5 µm. As another example, a display may include pixels 22 that are substantially square with a horizontal pixel pitch 26 of 99-µm±2-µm and a vertical pixel pitch 30 of 101-µm±2-µm. Although this disclosure describes and illustrates particular pixels having particular dimensions and particular pixel pitches, this disclosure contemplates other pixels having other dimensions and other pixel pitches.

In an embodiment, each pixel 22 includes dead space 33, which corresponds to regions of pixel 22 not occupied by a sub-pixel 24. In one example, sub-pixel 24 includes a color element that emits a particular color (e.g., red, green, or blue), and sub-pixel 24 is separated from adjacent sub-pixels 24 by dead space 33. Dead space 33 may include circuitry (e.g., conductive traces, wiring, drive transistors, or any other electronic components) associated with providing a drive current or voltage to a color-emitting element of sub-pixel 24. In one example, dead space 33 has a height (DSH) 34 that is defined as the distance between adjacent sub-pixels 24 along vertical axis 32 (such as the distance between the top edge of sub-pixel 24J and the bottom edge of sub-pixel 24C in FIG. 2). In one example, dead space 33 has a width (DSW) 36 that is defined as the distance between adjacent sub-pixels 24 along horizontal axis 28 (such as the distance between the right edge of sub-pixel 24I and the left edge of sub-pixel 24J). Although this disclosure describes and illustrates particular pixels with particular dead space having particular dimensions, this disclosure contemplates other pixels with other dead spaces having other dimensions.

Each sub-pixel 24 has a horizontal sub-pixel pitch 38, which is defined in an embodiment as the distance between corresponding features of two adjacent sub-pixels along horizontal axis 28, including width 36 of dead space 33 (such as the distance between the left edges of sub-pixels 24S and 24T in FIG. 2). Each sub-pixel 24 also has a vertical sub-pixel pitch 40, which is defined in an embodiment as the distance between corresponding features of two adjacent sub-pixels along vertical axis 32, including height 34 of dead space 33 (such as the distance between the lower edges of sub-pixels 24S and 24L). In an embodiment, horizontal sub-pixel pitch 38 is referred to as HSPP or $SPP_x$, and vertical sub-pixel pitch 40 is referred to as VSPP or $SPP_y$. In an embodiment, horizontal pixel pitch 26 is equal to three times horizontal sub-pixel pitch 38, so that $PP_x = 3 \times SPP_x$, or $SPP_x = \frac{1}{3} \times PP_x$. In an embodiment, vertical pixel pitch 30 is equal to vertical sub-pixel pitch 40.

Each sub-pixel 24 has a sub-pixel width (referred to as SPW or $SPD_x$) 42, which is defined in an embodiment as the sub-pixel dimension along horizontal axis 28 (such as the distance between the left and right edges of sub-pixel 24U in FIG. 2). In an embodiment, $SPD_x$ 42 is referred to as a distance between opposing edges of the color element of sub-pixel 24 along horizontal axis 28. Each sub-pixel 24 also has a sub-pixel height (referred to as SPH or $SPD_y$) 44, which is defined in an embodiment as the sub-pixel dimension along vertical axis 32 (such as the distance between the lower and upper edges of sub-pixel 24U). In an embodiment, $SPD_y$ 44 is referred to as a distance between opposing edges of the color element of sub-pixel 24 along vertical axis 32. In the example of FIG. 2, horizontal pixel pitch 26 is equal to three times horizontal sub-pixel pitch 38, and horizontal sub-pixel pitch 38 is equal to the sum of $SPD_x$ 42 and DSW 36. In the example of FIG. 2, vertical sub-pixel pitch 40 is equal to vertical pixel pitch 30, and vertical pixel pitch 30 is equal to the sum of $SPD_y$ 44 and DSH 34. In an embodiment, each pixel 22 includes three sub-pixels 24, and each sub-pixel 24 has approximately the same dimensions, $SPD_x$ 42 and $SPD_y$ 44.

In an embodiment, pixel 22 has a substantially square shape so that $PP_x \cong PP_y$. As an example, pixel 22 may have a square shape with height and width of approximately 150 μm. Such a 150-μm square pixel 22 has a $SPP_x$ 38 of approximately 50 μm since $SPP_x = \frac{1}{3} \times PP_x = \frac{1}{3} \times (150 \text{ μm}) = 50$ μm. Moreover, as an example, $SPD_x$ 42 may be approximately 42 μm, and DSW 36 may be approximately 8 μm, which corresponds to a $SPP_x$ 38 of 50 μm. Similarly, $SPD_y$ 44 may be approximately 140 μm, and DSH 34 may be approximately 10 μm, which corresponds to a vertical pixel pitch 30, or pixel height, of 150 μm. Although this disclosure describes and illustrates particular pixels and sub-pixels having particular shapes, arrangements, and dimensions, this disclosure contemplates any other pixels and sub-pixels having any other shapes, arrangements, and dimensions. Moreover, although this disclosure describes and illustrates particular pixels and sub-pixels having particular pitches and dimensions, this disclosure contemplates any other pixels and sub-pixels having any other pitches and dimensions.

Figure 3:
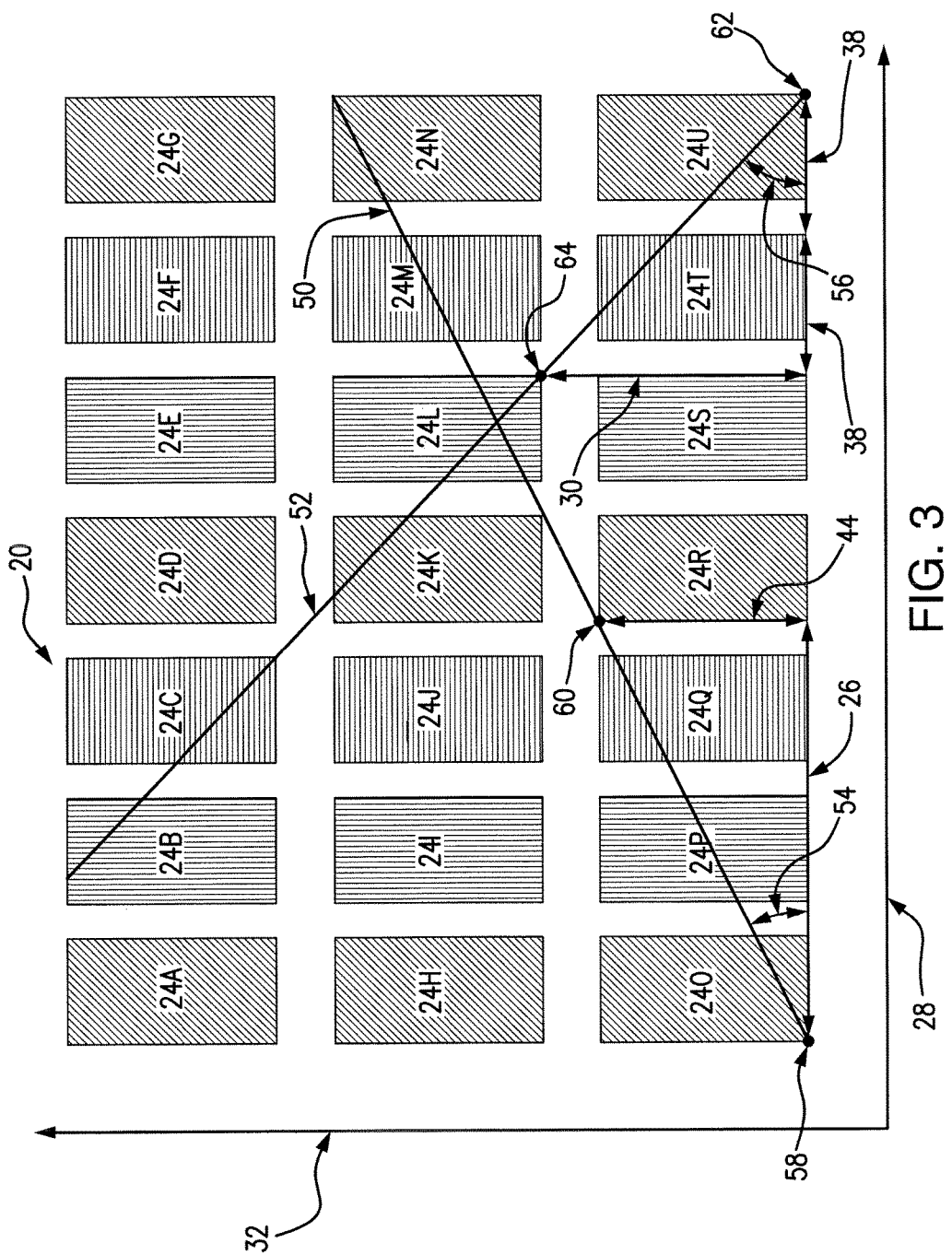
FIG. 3 illustrates the example portion of an example display that includes example pixels and sub-pixels, with example conductive lines overlying the example portion of an example display, according to an embodiment of the present disclosure.

FIG. 3 illustrates the example display portion 20 of an example display (e.g., the example display shown in FIG. 2) that includes example pixels and sub-pixels 24, with example conductive lines 50 and 52 overlying the example portion 20 of an example display, according to an embodiment of the present disclosure. In an example embodiment, conductive lines 50 and 52 are FLM and make up part of a mesh pattern of an electrode of a touch sensor. In an embodiment, an arrangement of conductive lines that make up at least part of a touch sensor are referred to as a mesh, mesh pattern, or mesh design. Although this disclosure describes and illustrates a touch sensor overlying a display, this disclosure contemplates other portions of a touch sensor (including other portions of conductive lines 50 and 52) being disposed on one or more layers on or within a display stack of the display.

In the example of FIG. 3, conductive line 50 is oriented at an angle 54 ($\theta_{54}$) relative to horizontal axis 28, and conductive line 52 is oriented at an angle 56 ($\theta_{56}$) relative to horizontal axis 28. Angle 54 of conductive line 50 can be illustrated by drawing a line that passes through reference points 58 and 60, where reference point 58 is located at the lower left corner of sub-pixel 24O and reference point 60 is located at the upper left corner of sub-pixel 24R. The slope of conductive line 50 can be defined as the vertical rise of conductive line 50 divided by the horizontal run of conductive line 50, and angle 54 can be found from the arctangent of that slope. In the example of FIG. 3, the vertical rise of conductive line 50 is $SPD_y$ 44, and the horizontal run of conductive line 50 is $PP_x$ 26. Thus, the slope of conductive line 50 equals $$\left(\frac{SPD_y}{PP_x}\right),$$

and angle 54 can be found from the expression $$\theta_{54} = \arctan\left(\frac{SPD_y}{PP_x}\right).$$

In FIG. 3, the vertical rise of conductive line 50 can also be expressed as ($PP_y$–DSH), in which case the slope of conductive line 50 can be written $$\left(\frac{PP_y - DSH}{PP_x}\right),$$

and angle 54 can be found from the expression $$\theta_{54} = \arctan\left(\frac{PP_y - DSH}{PP_x}\right).$$

In the example of FIG. 3, angle 56 of conductive line 52 is illustrated by drawing a line that passes through reference points 62 and 64, where reference point 62 is located at the lower right corner of sub-pixel 24U and reference point 64 is located at the lower right corner of sub-pixel 24L. The slope of conductive line 52 can be defined as the vertical rise of conductive line 52 divided by the horizontal run of conductive line 52, and angle 56 can be found from the arctangent of that slope. In the example of FIG. 3, the vertical rise of conductive line 52 is $PP_y$ 30, and the horizontal run of conductive line 52 is two times $SPP_x$ 38. Thus, the slope of conductive line 52 equals $$\left(\frac{PP_y}{2 \times SPP_x}\right),$$

and angle 56 can be found from the expression $$\theta_{56} = \arctan\left(\frac{PP_y}{2 \times SPP_x}\right).$$

In FIG. 3, the horizontal run of conductive line 52 can also be expressed as $\frac{2}{3}PP_x$, in which case the slope of conductive line 52 can be written $$\left(\frac{PP_y}{\frac{2}{3}PP_x}\right),$$

and angle 56 can be found from the expression $$\theta_{56} = \arctan\left(\frac{3PP_y}{2PP_x}\right).$$

Although this disclosure describes and illustrates particular angles 54 and 56 of conductive lines 50 and 52, this disclosure contemplates other conductive lines having other angles.

In the example of FIG. 3, conductive line 50 is oriented counterclockwise at angle 54 relative to horizontal axis 28, and conductive line 52 is oriented clockwise at angle 56 relative to horizontal axis 28. In an embodiment, a mesh design includes two sets of conductive lines, where the first set includes conductive lines that are substantially parallel and have a counterclockwise orientation with respect to horizontal axis 28 at an angle 54, and the second set includes conductive lines that are substantially parallel and have a clockwise orientation with respect to horizontal axis 28 at an angle 56. In an embodiment, conductive line 50 is oriented clockwise at angle 54 relative to horizontal axis 28, and conductive line 52 may is oriented counterclockwise at angle 56 relative to horizontal axis 28. In an embodiment, conductive line 50 is oriented clockwise or counterclockwise at angle 54 relative to horizontal axis 28, and conductive line 52 is oriented clockwise or counterclockwise at angle 56 relative to horizontal axis 28. Although this disclosure describes and illustrates example conductive lines 50 and 52 having particular orientations relative to horizontal axis 28, this disclosure contemplates any clockwise or counterclockwise orientation of conductive lines relative to any axis.

In an embodiment, angle 54 of conductive lines 50 may be illustrated by drawing a line passing through reference point 58 and a second reference point. For example, reference point 58 is located at a lower-left corner of a sub-pixel 24, and the second reference point is located, e.g., at lower-left corners of other sub-pixels 24. Relative to reference point 58, the second reference point is located, e.g., one vertical pixel pitch 30 in the direction of vertical axis 32 and an integer number of horizontal sub-pixel pitches 38 in the direction of horizontal axis 28 (e.g., to the right in FIG. 3). Similarly, angle 56 of conductive lines 52 may be illustrated by drawing a line passing through reference point 62 and a second reference point. For example, reference point 62 is located at a lower-right corner of a sub-pixel 24, and the second reference point is located, e.g., at lower-right corners of other sub-pixels 24. Relative to reference point 62, the second reference point is located, e.g., one vertical pixel pitch 30 in the direction of vertical axis 32 and an integer number of horizontal sub-pixel pitches 38 in the direction opposite to horizontal axis 28 (e.g., to the left in FIG. 3).

In an embodiment, the slope of a conductive line 50 may be defined as a vertical rise of conductive line 50 divided by a horizontal run of conductive line 50, and angle 54 can be found from the arctangent of the slope. For example, the vertical rise of conductive lines 50 is vertical pixel pitch 30 ($PP_y$), and the horizontal run of conductive lines 50 is an integer multiple of $SPP_x$ 38, which may be expressed as m×$SPP_x$, where in is a positive integer. Since, as described above, $SPP_x$=⅓×$PP_x$, the horizontal run of conductive lines 50 may be expressed as m×⅓×$PP_x$. In an embodiment, the slope of conductive lines 50 may be expressed as $$\frac{PP_y}{\left(m \times \frac{1}{3} \times PP_x\right)},$$

where m is a positive integer, and angle 54 ($\theta_{54}$) can be found from the expression $$\theta_{54} = \arctan\left[\frac{PP_y}{\left(m \times \frac{1}{3} \times PP_x\right)}\right] = \arctan\left[\frac{3}{m} \times \frac{PP_y}{PP_x}\right].$$

In an embodiment, pixel 22 may have a substantially square shape, and $PP_x$ and $PP_y$ may be approximately equal. For such pixels 22 with a square shape, angle 54 may then be expressed as $\theta_{54}$=arctan(3/m).

In an embodiment, the slope of a conductive line 52 may similarly be defined as a vertical rise of conductive line 52 divided by a horizontal run of conductive line 52, and angle 56 can be found from the arctangent of the slope. For example, the vertical rise of conductive lines 52 is vertical pixel pitch 30 ($PP_y$), and the horizontal run of conductive lines 50 is an integer multiple of $SPP_x$ 38, which may be expressed as n×$SPP_x$, where n is a positive integer. Since, as described above, $SPP_x$=⅓×$PP_x$, the horizontal run of conductive lines 52 may be expressed as n×⅓×$PP_x$. In an embodiment, the slope of conductive lines 52 may be expressed as $$\frac{PP_y}{\left(n \times \frac{1}{3} \times PP_x\right)},$$

where n is a positive integer, and angle 56 ($\theta_{56}$) can be found from the expression $$\theta_{56} = \arctan\left[\frac{PP_y}{\left(n \times \frac{1}{3} \times PP_x\right)}\right] = \arctan\left[\frac{3}{n} \times \frac{PP_y}{PP_x}\right].$$

In an embodiment, the positive integers m and n may be referred to as angle parameters for a mesh pattern. In particular embodiments, pixel 22 may have a substantially square shape, and $PP_x$ and $PP_y$ may be approximately equal. For such pixels 22 with a square shape, angle 56 may then be expressed as $\theta_{56}$=arctan(3/n). In an embodiment, angle 54 may have the same magnitude as angle 56. In an embodiment, a mesh design may include angles 54 and 56 with approximately the same magnitude, and the associated conductive lines 50 and 52 may appear to be reflected about a vertical axis.

In the example of FIG. 3, reference points 58, 60, 62, and 64 do not correspond to any conductive or other material of a touch sensor. Instead, reference points 58, 60, 62, and 64 are used as a basis to determine angles 54 and 56 of a mesh pattern. Moreover, in the example of FIG. 3, reference points 58, 60, 62, and 64 are intended as a guide to illustrating or constructing angles 54 and 56, and reference points 58, 60,

62, and 64 are not constrained to be located only at particular locations such as lower-left or lower right corners of particular sub-pixels 24. As an example, reference points 58, 60, 62, and 64 may be referenced to any other locations, such as for example, a corner, an edge, or a center of particular pixels 22, sub-pixels 24, or regions of dead space 33. Similarly, conductive lines 50 and 52 are not constrained to pass through any particular reference points (e.g., 58, 60, 62, or 64); rather, conductive lines 50 and 52 are at least in part characterized by their angles, 54 and 56, respectively, with respect to horizontal axis 28. In an embodiment, conductive lines 50 and 52 need not be constrained to pass through any particular reference points but may be displaced along horizontal axis 28 and vertical axis 32 by any other amount. Additionally, a mesh pattern that includes conductive lines 50 and 52 may be displaced horizontally, vertically, or both relative to pixels 22 or sub-pixels 24 (as may occur during a manufacturing process) without substantially degrading the optical performance of the mesh pattern. As an example, a mesh pattern made up of conductive lines 50 and 52 may have any alignment or displacement relative to pixels 22 or sub-pixels 24 of a display. Although this disclosure describes and illustrates particular conductive lines having particular angles, this disclosure contemplates any other conductive lines having any angles. Moreover, although this disclosure describes and illustrates particular conductive lines having particular angles defined by particular reference points, this disclosure contemplates any other conductive lines having any angles defined by any reference points.

Figure 4:
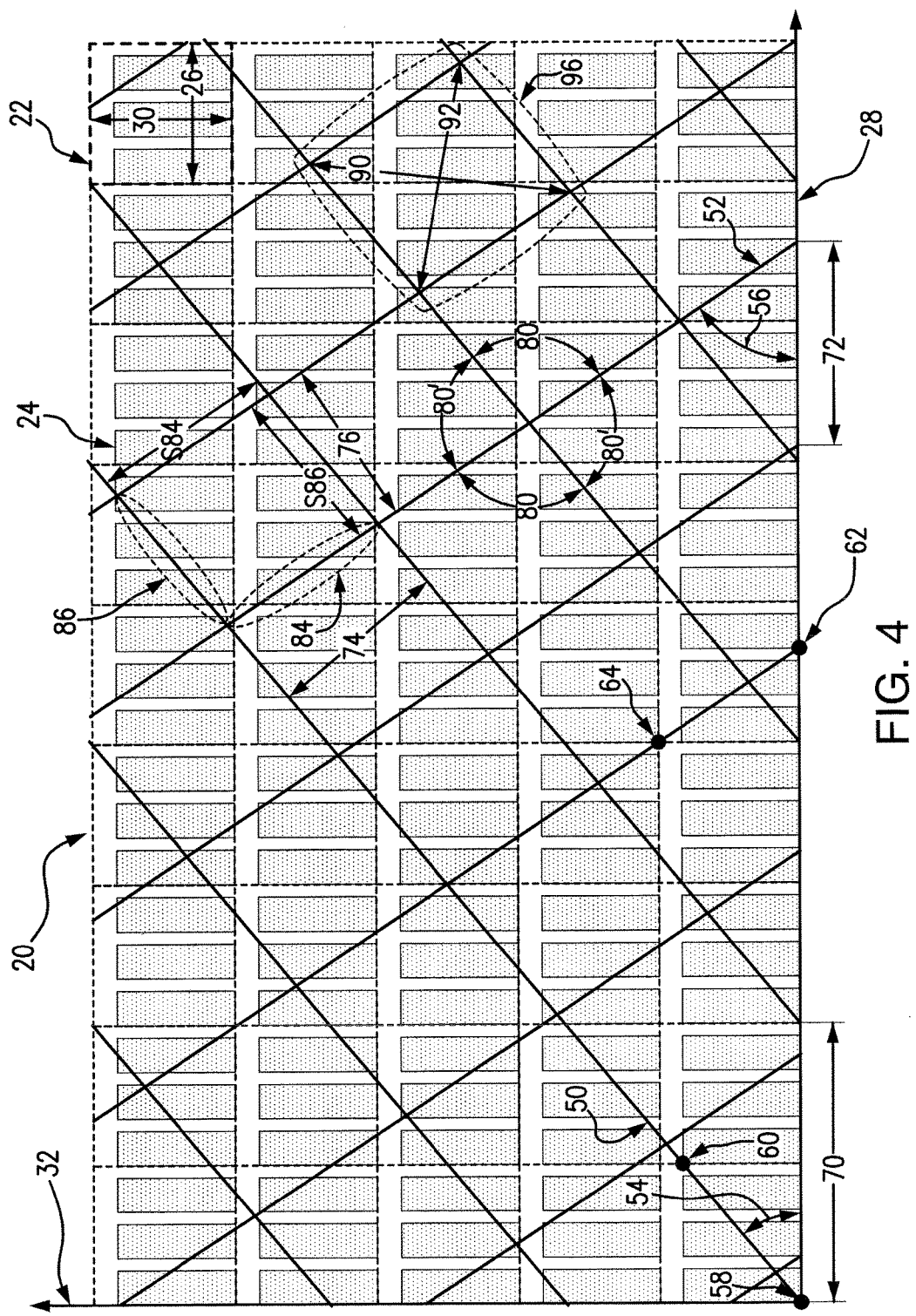
FIG. 4 illustrates an example mesh design overlying an example portion of an example display, according to an embodiment of the present disclosure.

FIG. 4 illustrates an example mesh design overlying an example portion 20 of an example display, according to an embodiment of the present disclosure. Display portion 20 includes pixels 22 arranged along horizontal axis 28 and vertical axis 32. In FIG. 4, each pixel 22 has horizontal pixel pitch 26 ($PP_x$) and vertical pixel pitch 30 ($PP_y$), and each pixel 22 includes three sub-pixels 24. Pixels 22 in FIG. 4 are substantially square so that $PP_x$ and $PP_y$ are approximately the same. The example mesh design in FIG. 4 includes conductive lines 50 and 52, and in an example embodiment conductive lines 50 and 52 are FLM and make up part of a mesh pattern of an electrode of a touch sensor.

Conductive lines 50 in FIG. 4 are substantially parallel to each other, and each conductive line 50 forms an angle 54 relative to horizontal axis 28. Additionally, conductive lines 50 in FIG. 4 are substantially evenly spaced from one another with adjacent conductive lines 50 having an equal horizontal separation distance 70 along horizontal axis 28. Conductive lines 52 in FIG. 4 are also substantially parallel to each other, forming an angle 56 relative to horizontal axis 28. Conductive lines 52 are also substantially evenly spaced from one another with adjacent conductive lines 52 having an equal horizontal separation distance 72. As described above and illustrated in FIG. 3, angles 54 and 56 in FIG. 4 can be found from the expressions $$\theta_{54} = \arctan\left(\frac{SPD_y}{PP_x}\right) \text{ and } \theta_{56} = \arctan\left(\frac{PP_y}{2 \times SPP_y}\right),$$

respectively. In an embodiment, horizontal separation distance 70 refers to a distance between adjacent conductive lines 50 as measured along horizontal axis 28. Similarly, in an embodiment, horizontal separation distance 72 refers to a distance between adjacent conductive lines 52 as measured along horizontal axis 28. In an embodiment, horizontal separation distances 70 and 72 can be referred to as separation distances, line separation distances, horizontal line-separation distances, or line spacings.

In an embodiment, conductive lines 50 have a horizontal separation distance 70 along horizontal axis 28 that can be expressed as $D_{70} = k \times PP_x$, where $D_{70}$ is horizontal separation distance 70 of conductive lines 50, k is a positive integer, and $PP_x$ is horizontal pixel pitch 26. In an embodiment, k can be referred to as a line-separation parameter. Similarly, in an embodiment, conductive lines 52 have a horizontal separation distance 72 along horizontal axis that can be expressed as $$D_{72} = \frac{13}{18} \times k \times PP_x,$$

where $D_{72}$ is horizontal separation distance 72 of conductive lines 52 and k is the same positive integer used to determine $D_{70}$. Horizontal separation distance 72 may also be expressed equivalently as $$D_{72} = \left(2\frac{1}{6}\right) \times \frac{k}{3} \times PP_x.$$

In an embodiment, if horizontal pixel pitch 26 equals three times horizontal sub-pixel pitch 38, the expression for horizontal separation distance 72 can be written $$D_{72} = \left(2\frac{1}{6}\right) \times SPP_x \times k.$$

In the example of FIG. 4, the line-separation parameter k equals 2, which gives a horizontal separation distance 70 of $D_{70} = 2 \times PP_x$, and a horizontal separation distance 72 of $$D_{72} = \frac{13}{9} \times PP_x.$$

In an embodiment, perpendicular separation distance 74 indicates a distance between two adjacent, parallel conductive lines as measured along a direction perpendicular to the two lines. In an embodiment, a perpendicular separation distance 74 between conductive lines 50 is measured in a direction perpendicular to conductive lines 50. Perpendicular separation distance 74 is related to horizontal separation distance 70 by the expression $D_{74} = D_{70} \sin \theta_{54}$, where $D_{74}$ is perpendicular separation distance 74. Similarly, in an embodiment, a perpendicular separation distance 76 between conductive lines 52 is measured in the direction perpendicular to conductive lines 52. Perpendicular separation distance 76 is related to horizontal separation distance 72 by the expression $D_{76} = D_{72} \sin \theta_{56}$, where $D_{76}$ is perpendicular separation distance 76. In FIG. 4, perpendicular separation distance 74 equals $2PP_x \sin \theta_{54}$, and perpendicular separation distance 76 equals $13/9 PP_x \sin \theta_{56}$.

In the example embodiment of FIG. 4, angle 80 ($\theta_{80}$) is an angle between conductive lines 50 and 52, and angle 80 equals the sum of angles 54 and 56, or $\theta_{80} = \theta_{54} + \theta_{56}$. In the example embodiment of FIG. 4, angle 80' ($\theta'_{80}$) is another angle between conductive lines 50 and 52, and angle 80' is the supplement to angle 80, so that angle 80' is $180° - \theta_{80}$. In an embodiment, angle 80 refers to an angle between conductive lines 50 and 52, where angle 80 faces in a nominally horizontal direction. Similarly, in an embodiment, angle 80' refers to an angle between conductive lines 50 and 52, where angle 80' faces in a nominally vertical direction. In an embodiment, line segment 84 represents a length of conductive line 52 between two adjacent conductive lines 50. Line segment 84 has length $S_{84}$ that is related to horizontal separation distance 70 by the expression $$S_{84} = D_{70} \times \frac{\sin\theta_{54}}{\sin\theta'_{80}}.$$

Similarly, in an embodiment, line segment 86 represents a length of conductive line 50 between two adjacent conductive lines 52. For example, line segment 86 has length $S_{86}$ that is related to horizontal separation distance 72 by the expression $$S_{86} = D_{72} \times \frac{\sin\theta_{56}}{\sin\theta'_{80}}.$$

Segment length $S_{84}$ is related to perpendicular separation distance 74 ($D_{74}$) by the expression $$S_{84} = \frac{D_{74}}{\sin\theta'_{80}}.$$

Similarly, segment length $S_{86}$ is related to perpendicular separation distance 76 ($D_{76}$) by the expression $$S_{86} = \frac{D_{76}}{\sin\theta'_{80}}.$$

In an embodiment, a mesh cell 96 includes three or more portions or segments of conductive lines 50 and 52 that together form an enclosed shape, such as for example a triangle, parallelogram, or quadrilateral. In FIG. 4, mesh cell 96 includes two adjacent line segments 84 and two adjacent line segments 86 that together form a four-sided shape. In an embodiment, a mesh design includes multiple mesh cells 96 arranged in a repeating pattern. Although this disclosure describes and illustrates particular mesh cells that include a particular number of line segments, this disclosure contemplates any other mesh cells that include any number of line segments. In FIG. 4, diagonal length 90 is the distance between the two opposite vertices of mesh cell 96 that represent the vertical extent of the mesh cell. Similarly, diagonal length 92 is the distance between the other two opposite vertices of mesh cell 96 that represent the horizontal extent of the mesh cell. In an embodiment, diagonal length 90 can be referred to as a vertical diagonal length, and diagonal length 92 can be referred to as a horizontal diagonal length. In an embodiment, diagonal length 90 ($D_{90}$) is found from the expression $D_{90}^2 = S_{84}^2 + S_{86}^2 - 2S_{84}S_{86}\cos\theta_{80}$, and diagonal length 92 ($D_{92}$) is found from the expression $D_{92}^2 = S_{84}^2 + S_{86}^2 - 2S_{84}S_{86}\cos\theta'_{80}$.

In an embodiment, horizontal separation distances 70 and 72, perpendicular separation distances 74 and 76, line segment lengths $S_{84}$ and $S_{86}$, or diagonal lengths 90 and 92 can vary by any other percentage. In an embodiment, such variation in distance or length occurs during a manufacturing process (as an intentional design feature, or as an incidental result of routine process variations).

Although this disclosure describes and illustrates particular mesh patterns having particular mesh cells with particular segment lengths and diagonal lengths, this disclosure contemplates any other mesh patterns having any other mesh cells with any segment lengths and diagonal lengths. Moreover, although this disclosure describes and illustrates particular meshes that have particular conductive lines 50 and 52 with particular curves (e.g., substantially straight) this disclosure contemplates any other meshes that have any other conductive lines with any curves (such as substantially sinusoidal, as one non-limiting example).

Furthermore, FIG. 4 illustrates example lines 50 and 52 of an example mesh design. In an embodiment, a mesh pattern includes two or more conductive lines 50 and 52. In an embodiment, a mesh pattern includes on the order of 1, 10, 100, 1,000, or any other number of conductive lines 50 and 52. This disclosure contemplates any other mesh pattern that includes any number of conductive lines.

Figure 5:
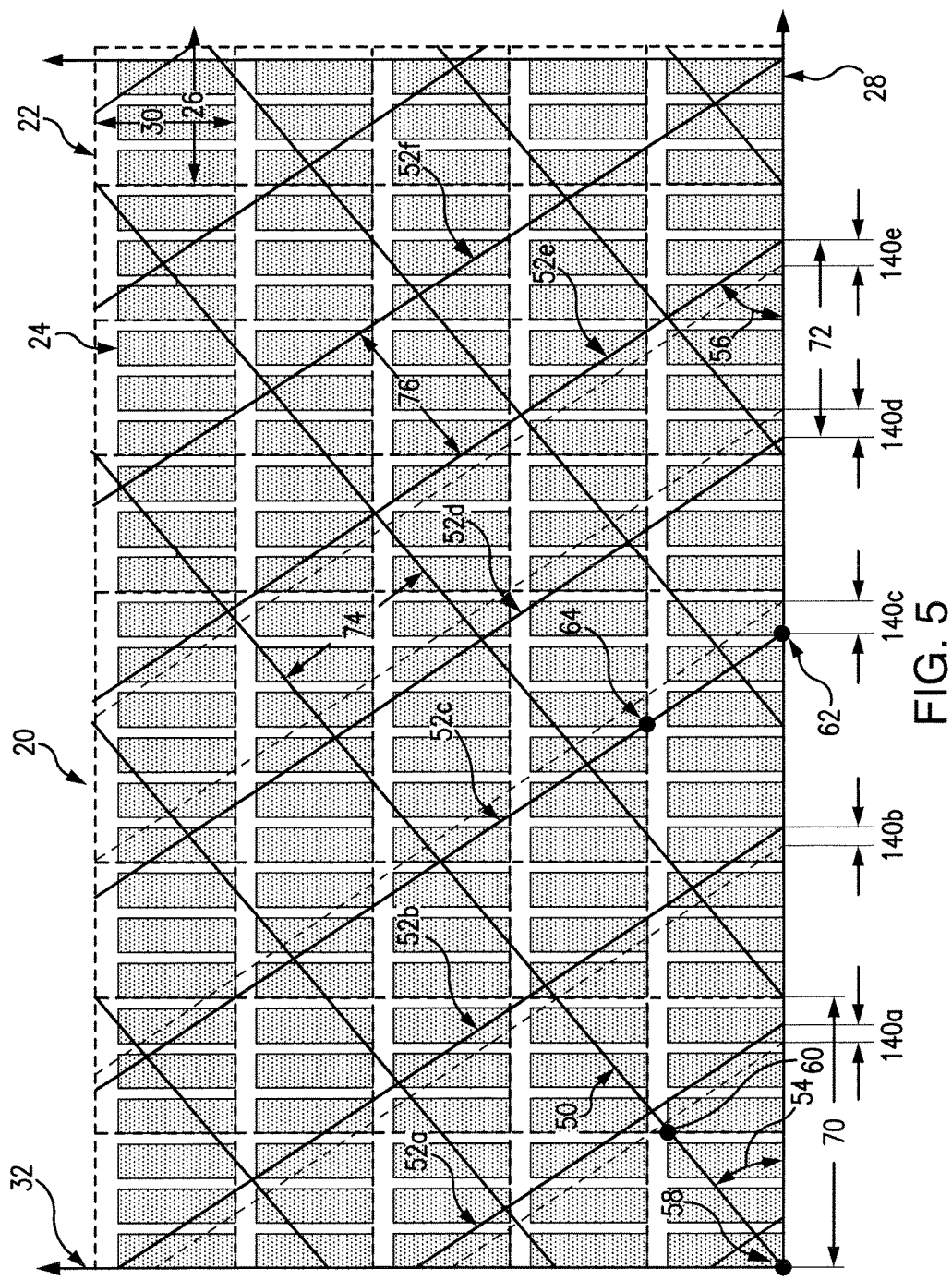
FIG. 5 illustrates an example mesh design utilizing a phasor modulation technique overlying an example portion of an example display, according to an embodiment of the present disclosure.
Figure 6:
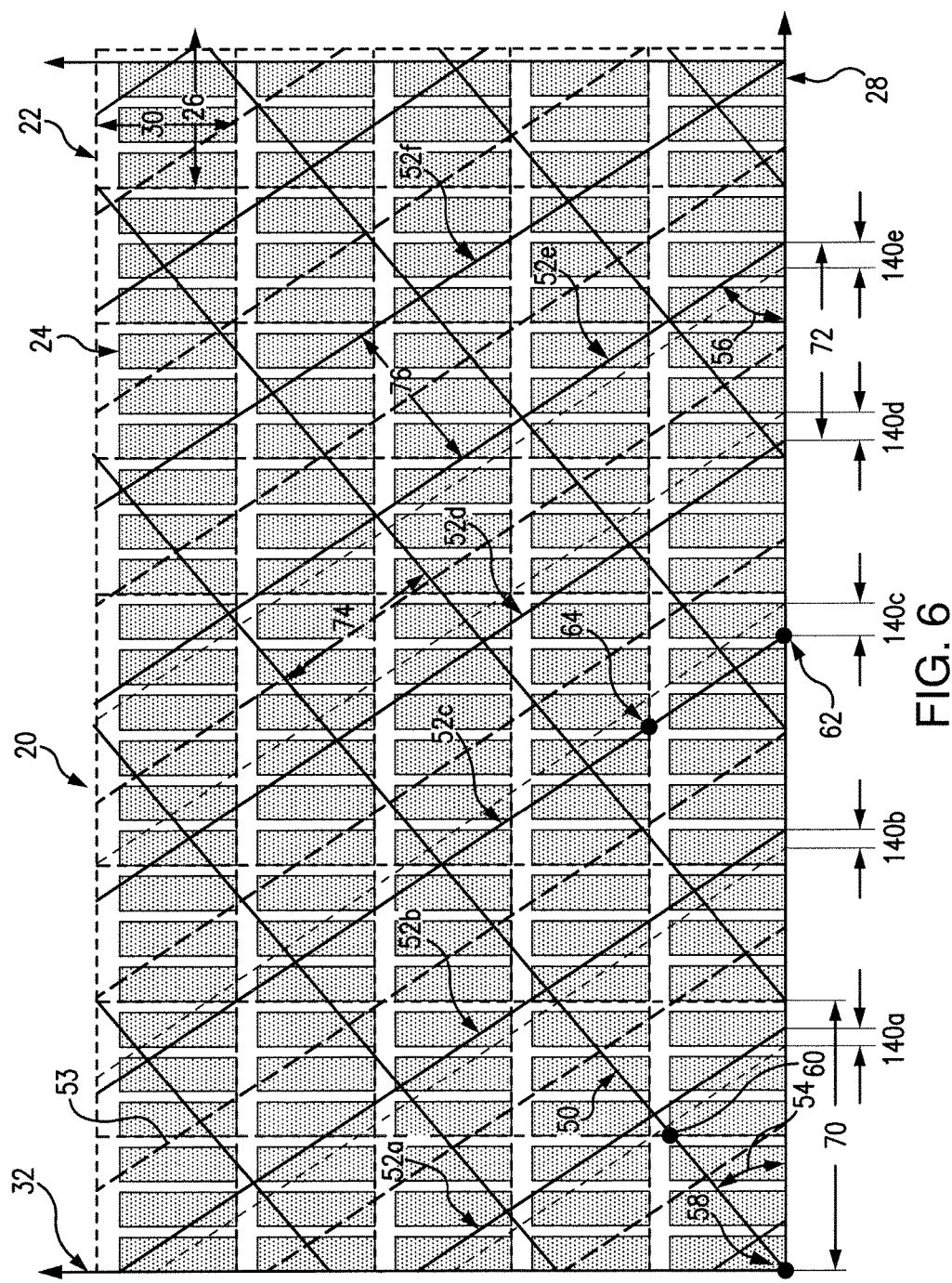
FIG. 6 illustrates an example single-layer touch sensor mesh design utilizing a phasor modulation technique overlying an example portion of an example display, according to an embodiment of the present disclosure.

In addition, a mesh pattern represented by conductive lines 50 and 52 in the examples of FIGS. 4-6 may have a single-layer, dual-layer, or other multi-layer configuration. In an embodiment, a single-layer mesh pattern refers to a mesh pattern where conductive lines 50 and 52 are disposed on one side or surface of a substrate. In an embodiment, a dual-layer mesh pattern includes a mesh pattern formed by conductive lines 50 and 52, disposed on one or more surfaces of one or more substrates. As an example, a dual-layer mesh pattern may have a first layer of conductive lines 50 and 52 disposed on one side or surface of a substrate and a second layer of conductive lines 50 and 52 disposed on another side or surface of the same substrate. As another example, a dual-layer mesh pattern may have a first layer of conductive lines 50 and 52 disposed on one surface of one substrate and a second layer of conductive lines 50 and 52 disposed on one surface of another substrate. This disclosure contemplates a touch sensor having a mesh pattern with any number of layers of conductive lines 50 and 52. In an embodiment having dual-layer (or multi-layer) touch-sensor configurations, one or more layers of conductive lines 50 and 52 provide drive electrodes of the touch sensor and one or more other layers of conductive lines 50 and 52 provide sense electrodes of the touch sensor. Although this disclosure describes and illustrates particular mesh designs having particular single-layer, dual-layer, or multi-layer configurations, this disclosure contemplates any other mesh design having any single-layer, dual-layer, or multi-layer configuration.

FIG. 5 illustrates an example mesh design utilizing a phasor modulation technique overlying an example portion of an example display, according to an embodiment of the present disclosure. FIG. 5 shares certain features similar to FIG. 4, and like numbers represent the same elements in FIG. 5 as they did in FIG. 4, unless otherwise noted. In an embodiment, FIG. 5 describes a dual-layer touch sensor, which has two mesh layers. For clarity, FIG. 5 shows only one mesh layer (the mesh created by conductive lines 52 and 50) of the dual-layer mesh; however, in this embodiment, a second mesh layer also exists, thus creating a dual-layer mesh design. The second mesh is not illustrated in FIG. 5 for clarity's sake, but is instead described in this disclosure. In such an embodiment, the two mesh layers are, for example, electrically isolated from one another (e.g., by a dielectric substrate, etc.). In an embodiment, the second mesh layer contains conductive lines that have substantially the same dimensions (e.g., separation distances and/or angles) as the illustrated mesh layer. In an embodiment, the conductive lines of the second mesh layer are substantially parallel to the conductive lines of the illustrated mesh layer. In an embodiment, the second mesh layer may be positioned such that the conductive lines of the illustrated mesh and the second mesh are not directly overlapping when viewed from above. In one example, the vertices of the illustrated mesh can be roughly in the center of the cells of the second mesh and vice versa. In an embodiment, when viewed from above, the conductive lines appear to alternate between the illustrated mesh layer and the second mesh layer. For example, conductive lines 52 may appear from above to alternate with a set of substantially parallel conductive lines of the second mesh layer. In another embodiment, the second mesh layer, which is not shown in FIG. 5, may or may not have the same dimensions as the illustrated mesh layer (conductive lines 52 and 50), and/or may or may not have conductive lines that are substantially parallel to the illustrated mesh layer. The embodiment of FIG. 5 is described as showing dual-layer touch sensor embodiments, but some or all of FIG. 5 can also describe single-layer or other multi-layer touch sensor embodiments.

FIG. 5 shows an example phasor modulation technique used on conductive lines 52, and particularly on conductive lines 52a-52e. In an embodiment, using a phasor modulation technique results in a pattern of translational shifts in the position of conductive lines according to the particular phasor being used. Phasor modulation is, for example, a design technique used to modify the spacing of some conductive lines (e.g., conductive lines 52) that are part of a mesh of conductive lines. Phasor modulation takes place, for example, before the mesh of conductive lines is manufactured, coupled to a substrate, and/or integrated with a display, etc. FIG. 5 shows the use of an example phasor modulation technique on a selected number of conductive lines 52 (i.e., conductive lines 52a-52e), though in other examples fewer, more, or even substantially all conductive lines 52 may be modulated. In this example embodiment, a phasor modulation technique is used to modulate one set of conductive lines (52a-52e) from the illustrated mesh layer, while the other set of conductive lines (50) from the illustrated mesh layer, as well as the conductive lines of the unillustrated second mesh layer, are not modulated. More specifically, in an embodiment—e.g., a dual-layer touch sensor embodiment having two meshes (a first and second)—adjacent lines of a set of conductive lines of the first mesh (e.g., conductive lines 52a-52e) are modulated according to a phasor modulation technique, and unmodulated lines of a set of conductive lines of the second mesh are located in between (and are substantially parallel to) the set of conductive lines of the first mesh, as viewed from above. In this example, when viewed from above, the two sets of conductive lines from the first and second meshes create an alternating pattern of modulated (52a-52e) and unmodulated (not illustrated) conductive lines such that every other conductive line is modulated. In other embodiments, the pattern of modulated conductive lines is more or less than every other conductive line, as viewed from above in a dual-layer touch sensor design having multiple meshes. In other embodiments, both conductive lines 50 and 52, or any other number of sets of conductive lines (from the illustrated mesh layer and/or the unillustrated second mesh layer), may each be subject to the same or difference phasor modulation techniques.

As in FIG. 4, conductive lines 50 are substantially parallel to each other, and each conductive line 50 forms an angle 54 relative to horizontal axis 28, for example. Additionally, conductive lines 50 are substantially evenly spaced from one another with adjacent conductive lines 50 having an equal horizontal separation distance 70 along horizontal axis 28.

Conductive lines 52 in FIG. 5 are also substantially parallel to each other, forming an angle 56 relative to horizontal axis 28, for example. Without phasor modulation, conductive lines 52 are also substantially evenly spaced from one another with adjacent conductive lines 52 having an equal horizontal separation distance 72. However, in FIG. 5, by implementing phasor modulation on conductive lines 52, some or all of conductive lines 52 are shifted in a pattern according to the phasor modulation used and thus are not necessarily substantially evenly spaced from one another (though they do remain substantially parallel in this example). Therefore, in this example, different sets of adjacent conductive lines 52 have an unequal horizontal separation distance. In an embodiment, the unequal horizontal separation distances between adjacent conductive lines 52 form a repeating pattern. In FIG. 5, the dashed lines close to and parallel to conductive lines 52a-52e represent the location of conductive lines 52a-52e when subjected to phasor modulation. For example, phasor modulation shifts conductive line 52a to the location of the dashed line to the left of conductive line 52a. As another example, phasor modulation shifts conductive line 52c to the location of the dashed line to the right of conductive line 52c. The conductive lines subjected to phasor modulation can be referred to as modulated conductive lines.

It is this pattern of changing horizontal separation distances between conductive lines 52 that modifies the mesh pattern of the conductive lines such that, in an embodiment, the modified mesh pattern mitigates frequency moiré patterns while preserving optical performance. In an example embodiment having a dual-layer sensor configuration with two meshes, adjacent conductive lines of the first mesh (e.g., conductive lines 52a-e) are modulated to create a pattern of changing horizontal separation distances. In an embodiment of this example, conductive lines of the second mesh are unmodulated and placed between the conductive lines of the first mesh such that, for example when viewed from above, the conductive lines of the first and second mesh alternate so that every other conductive line (i.e., the conductive lines of the first mesh) is modulated.

Figure 7A:
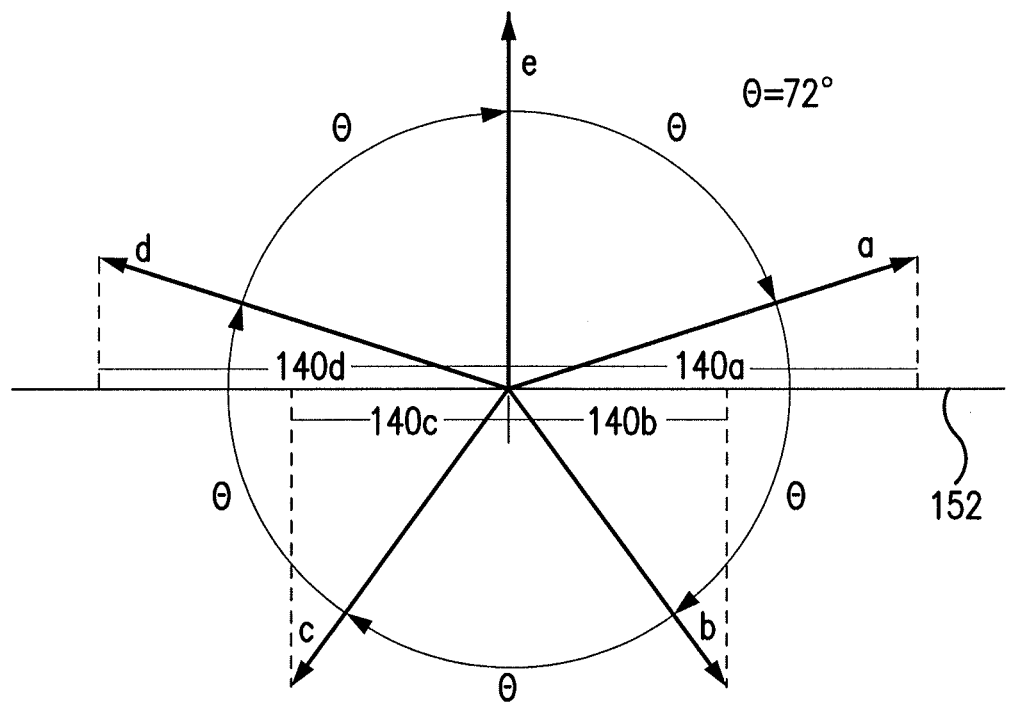
FIGS. 7A, 7B, and 7C illustrate examples of phasors for a mesh design utilizing phasor modulation, according to an embodiment of the present disclosure.
Figure 7B:
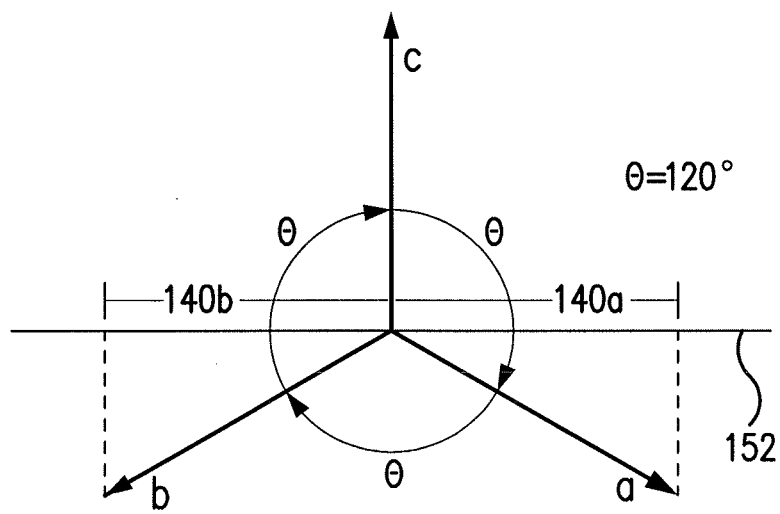
Figure 7C:
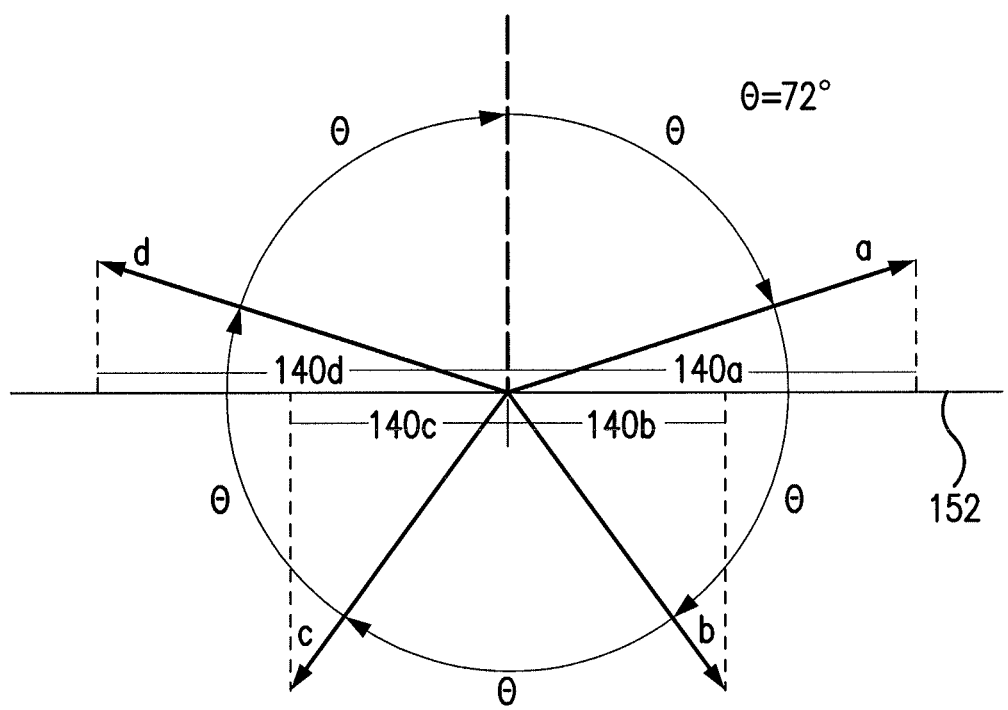

Phasor modulation distances 140a-140d represent the distance along horizontal axis 28 between the original conductive line 52 and the modulated conductive line 52. Phasor modulation distances can be calculated as equal to (phasor magnitude)×cos(phasor step θ), which is described further in connection with FIGS. 7A and 7B. Examples of sets of phasors are shown in FIGS. 7A, 7B, and 7C. For example, 140a represents the phasor modulation distance between original conductive line 52a (the dark solid line) and modulated conductive line 52a (the dashed line parallel and to the left of original conductive line 52a). Likewise, 140b represents the phasor modulation distance between original conductive line 52b (the dark solid line) and modulated conductive line 52b (the dashed line parallel and to the left of original conductive line 52b). Similarly, 140c represents the phasor modulation distance between original conductive line 52c (the dark solid line) and modulated conductive line 52c (the dashed line parallel and to the right of original conductive line 52c). Further, 140d represents the phasor modulation distance between original conductive line 52d (the dark solid line) and modulated conductive line 52d (the dashed line parallel and to the right of original conductive line 52d).

Finally, the phasor modulation distance between original conductive line 52e (the dark solid line) and modulated conductive line 52e (the dashed line parallel and to the left of original conductive line 52e) could be labeled 140e, but instead is labeled 140a because in the example embodiment illustrated in FIG. 5, the phasor modulation distance of conductive line 52e is substantially equal to the phasor modulation distance of conductive line 52a (i.e. 140a). In this embodiment, the phasor modulation distance for conductive lines 52a and 52e are substantially equal because a set of four phasor steps (for example, the four phasor steps described in FIG. 7C), are used in this embodiment and the set of phasor steps begin to repeat themselves with conductive line 52e. Thus, in FIG. 5, conductive lines 52a-d are modulated according to the four phasor steps, respectively. For conductive line 52e, however, the phasor steps begin to repeat themselves, such that conductive lines 52a and 52e are modified by the same (first) phasor step. Similarly, in this example, conductive lines 52b and 52f would also be modified by the same (second) phasor step (though this is not shown in FIG. 5), etc., and the pattern would continue for some or substantially all of conductive lines 52.

In an embodiment, negative phasor modulation distances move modulated conductive lines 52 to the left of their original counterparts in FIG. 5. For example, phasor modulation distances 140a and 140b are negative. Conversely, positive phasor modulation distances move modulated conductive lines 52 to the right of their original counterparts in FIG. 5. For example, phasor modulation distances 140c and 140d are positive. In an embodiment, it is also possible to have a phasor modulation distance equal to zero when the cos(phasor step θ) value equals zero for one or more of the phasor steps. In such instances, the location of the original conductive line 52 and the modulated conductive line 52 would be substantially the same. Phasor steps that have their cos(phasor step θ) values equal to zero are known as carrier phasor steps. This disclosure contemplates phasors having any number of carrier phasor steps. In an embodiment, a set of phasor steps can be used where some or all of the carrier phasor steps are removed or "suppressed."

FIG. 6 illustrates an example single-layer touch sensor mesh design utilizing a phasor modulation technique overlying an example portion of an example display, according to an embodiment of the present disclosure. FIG. 6 is similar to FIG. 5, but the primary difference between the figures is that FIG. 6 illustrates phasor modulation of an example single-layer mesh design.

In the example embodiment of FIG. 6, a first set of conductive lines (52 and 53), together with a second set of conductive lines (50), create a single-layer mesh, where the conductive lines of the first set alternate between conductive lines 52 and 53. Though FIG. 6 retains markers for horizontal separation distance 72 and perpendicular separation distance 76 from previous figures (i.e., as measured between adjacent conductive lines 52) for context, the corresponding perpendicular separation distance and horizontal separation distance in FIG. 6 are measured between adjacent conductive lines 52 and 53 (which together form a single first set of conductive lines of a single-layer mesh). In an embodiment, conductive lines 52 (e.g., 52a, 52b, 52c, 52d, 52e, etc.) are modulated according to a phasor modulation technique, for example, as described elsewhere in this disclosure (e.g., regarding FIGS. 5 and 7A-7C). In an embodiment, conductive lines 53 are not modulated (i.e., unmodulated) according to a phasor modulation technique. Thus, in this embodiment, as shown in FIG. 6, the first set of conductive lines of the single-layer mesh alternate between modulated conductive lines (conductive lines 52) and unmodulated conductive lines (conductive lines 53), such that every other conductive line of the first set is modulated according to a phasor modulation technique. In other embodiments, some or all of the second set of conductive lines (e.g., conductive lines 50) can also be modulated. This disclosure contemplates other embodiments having a different pattern of modulated and unmodulated conductive lines, e.g., every third conductive line is modulated, all or nearly all conductive lines are modulated, a random number of conductive lines are unmodulated, etc. The embodiment of FIG. 6 is described as showing single-layer touch sensor embodiments, but some or all of FIG. 5 can also describe dual-layer or other multi-layer touch sensor embodiments.

This disclosure contemplates that, in an embodiment, a conductive line can be modulated by a phasor modulation distance of zero when the phasor step being used is at the carrier frequency. In such an embodiment, where a carrier phasor step is not suppressed and is part of a pattern of phasor steps, the conductive line being modified by the carrier phasor step can be understood to be "modulated," and thus part of a pattern of changing horizontal separation distances, even though its phasor modulation distance is zero.

FIGS. 7A, 7B, and 7C illustrate examples of phasors for a mesh design utilizing phasor modulation, according to an embodiment of the present disclosure. Phasors such as those in FIGS. 7A, 7B, and 7C can be used to modulate mesh designs, such as the modulated mesh design shown in FIG. 5 and FIG. 6. As an example, the phasor steps of a particular phasor can be used to translate the position of a particular conductive line (e.g., conductive line 52a) to a modulated position, as described in connection with FIG. 5 and FIG. 6.

In general, phasors can be conceptualized as the series of phasor steps created when a particular phasor angle θ is repeated around a 360 degree circle. In an embodiment, the phasor angle θ is determined by the equation θ=360°/x, such that the phasor steps are equidistant from each other (i.e., phasor angle θ is constant) and repeat themselves each time the circle is traversed, forming a cycle of phasor steps. This makes a finite set of phasor steps. For example, in FIG. 7A x=5 and therefore the phasor angle θ=72°. This produces a set of 5 phasor steps (shown as phasor steps a-e). As another example, in FIG. 7B, x=3 and therefore the phasor angle θ=120°. This produces a set of 3 phasor steps (shown as phasor steps a-c). Phasors with any other number of phasor steps, whether odd or even, can be used. In an embodiment, a phasor with an odd number of phasor steps is used. In an embodiment, the phasor angle θ is not determined by the equation θ=360°/x, such that the phasor steps do not repeat themselves each time the circle is traversed. As another example, the phasor angle θ is not constant between each phasor step, and further the phasor steps in this example may or may not repeat themselves each time the circle is traversed (and thus a repeating cycle of phasor steps may or may not be formed). This disclosure contemplates phasors having any number of steps, and any phasor magnitude.

FIG. 7A shows a set of equidistant phasor steps represented in a phasor diagram having five steps, and thus having a phasor angle θ=72°. The diagram is set on a Cartesian plane, with a horizontal axis 152 and a vertical axis that passes through phasor step e, which is perpendicular to horizontal axis 152. Starting at the positive vertical axis (i.e., in line with phasor step e), which represents 0°/360°, and rotating clockwise by one phasor angle θ (72°), lays phasor step a. At another clockwise rotation of one phasor angle θ lays phasor step b. At yet another clockwise rotation of one phasor angle θ lays phasor step c. At still another clockwise rotation of one phasor angle θ lays phasor step d, and finally at one more clockwise rotation of one phasor angle θ lays phasor step e, which lies at the vertical 0°/360° position. In this example, further rotations of phasor angle θ produces phasor steps identical to the first five phasor steps (a-e). In an embodiment, the magnitude of each phasor step (depicted as the length of the phasor steps) is the same and can be referred to as the phasor magnitude. In an embodiment, the phasor magnitude is 0.5 sub-pixel pitch, where sub-pixel pitch can be referred to as "SP" (for example, in FIGS. 8 and 9), though any other phasor magnitude can be used.

Phasor modulation distances 140a-140d can be calculated as equal to (phasor magnitude)×cos(phasor step θ), where the phasor step θ (which can also be known as "phasor step angle," "phasor step angle θ," or the angle or a particular phasor step) is the angle between the phasor step and horizontal axis 152. Thus, in this example, cos(phasor step θ) for phasor steps a-e can be calculated as (a) cos(18°)= 0.95, (b)) cos(−54°=0.59, (c) cos(−126°)=−0.59, (d) cos (162°)=−0.95, (e) cos(90°)=0. Phasor modulation distance 140e is not shown in FIG. 7A because it has a value of zero. In summary, the cos(phasor step θ) values for phasor steps a-e are 0.95, 0.59, −0.59, −0.95, and 0, respectively. In an embodiment, the cos(phasor step θ) values are normalized to 1, which yields values of 1, 0.62, −0.62, 1, and 0. Further, in an embodiment, the cos(phasor step θ) values are reordered from negative to positive, which yields values of −1, −0.62, 0, 0.62, and 1. Thus, in such an embodiment, phasor modulation distance 140a=−1×(phasor magnitude), phasor modulation distance 140b=−0.62×(phasor magnitude), phasor modulation distance 140c=0×(phasor magnitude), phasor modulation distance 140d=0.62×(phasor magnitude), and phasor modulation distance 140e=1×(phasor magnitude). In still other embodiments, the carrier phasor steps (the ones that produce phasor modulation distances equal to zero) are removed or "suppressed," which in this example yields four phasor modulation distances rather than five (see, for example, the four phasor steps of FIG. 7C): phasor modulation distance 140a=−1×(phasor magnitude), phasor modulation distance 140b=−0.62×(phasor magnitude), phasor modulation distance 140c=0.62×(phasor magnitude), and phasor modulation distance 140d=1×(phasor magnitude).

For example, the phasor modulation shown in FIG. 5 and FIG. 6 uses four repeating phasor modulation distances based four phasor steps, which can be created using a phasor with a phasor angle θ=72° (and any phasor magnitude, whether constant or not). Such a phasor yields five phasor steps, where one is a carrier phasor step. FIG. 7C shows the four phasor steps that are not at the carrier frequency, because FIG. 7C illustrates an example where the carrier phasor step is suppressed, which, in this example, leaves four phasor steps remaining (steps a-d). By dropping (suppressing) the carrier phasor step, reordering the cos(phasor step θ) values of the remaining four phasor steps from negative to positive, and multiplying each value by a phasor magnitude, two negative and two positive phasor modulation distances are created. Using these four phasor modulation distances in a repeating cycle to translate conductive lines creates the pattern of phasor modulation distances (140a-140d) seen in FIG. 5 and FIG. 6.

Thus, in an embodiment, a phasor modulation technique can be described as being implemented based on a phasor angle θ and a phasor magnitude of at least one phasor. In addition, in an embodiment, phasor step θ values for a phasor can be determined or based on one or more phasor angle θ of that phasor (for example, as described in this disclosure). Therefore, in an embodiment, a phasor modulation technique can also be described as being implemented based on one or more phasor step θ and a phasor magnitude of at least one phasor.

FIG. 7B shows a set of equidistant phasor steps represented in a phasor diagram having three steps, and thus having a phasor angle θ=120°. The diagram is set on a Cartesian plane, with a horizontal axis 152 and a vertical axis that passes through phasor step c, which is perpendicular to horizontal axis 152. Starting at the positive vertical axis (i.e., in line with phasor step c), which represents 0°/360°, and rotating clockwise by one phasor angle) (120°, lays phasor step a. At another clockwise rotation of one phasor angle θ lays phasor step b. At yet another clockwise rotation of one phasor angle θ lays phasor step c, which lies at the vertical 0°/360° position. Further rotations of phasor angle θ produces phasor steps identical to the first three phasor steps (a-c). In an embodiment, the magnitude of each phasor step (depicted as the length of the phasor steps) is the same and can be referred to as the phasor magnitude. In an embodiment, the phasor magnitude is 0.5 sub-pixel pitch, where sub-pixel pitch can be referred to as "SP" (for example, in FIGS. 8 and 9), though any other phasor magnitude can be used.

Phasor modulation distances 140a-140b can be calculated as equal to (phasor magnitude)×cos(phasor step θ), where the phasor step θ is the angle between the phasor step and horizontal axis 152. Thus, in this example, cos(phasor step θ) for phasor steps a-c can be calculated as (a) cos(−30°) =0.87, (b) cos(−150°)=−0.87, and (c) cos(90°)=0. Phasor modulation distance 140c is not shown in FIG. 7B because it has a value of zero. In summary, the cos(phasor step θ) values for phasor steps a-c are 0.87, −0.87, and 0, respectively. In an embodiment, the cos(phasor step θ) values are normalized to 1, which yields values of 1, −1, and 0. Further, in an embodiment, the cos(phasor step θ) values are reordered from negative to positive, which yields values of −1, 0, and 1. Thus, in such an embodiment, phasor modulation distance 140a=−1×(phasor magnitude), phasor modulation distance 140b=0×(phasor magnitude), and phasor modulation distance 140c=1×(phasor magnitude). In still other embodiments, the carrier phasor steps (the ones that produce phasor modulation distances equal to zero) are removed or "suppressed," which in this example yields two phasor modulation distances rather than three: phasor modulation distance 140a=−1×(phasor magnitude), and phasor modulation distance 140b=1×(phasor magnitude).

FIG. 7C shows an example of a set of phasor steps, where a phasor step at the carrier frequency is suppressed. FIG. 7C is similar to FIG. 7A in that it shows a set of equidistant phasor steps represented in a phasor diagram having five steps, and thus has a phasor angle θ=72°; however FIG. 7C is different in that the carrier phasor step is suppressed (and therefore not shown). Thus, FIG. 7A includes the "e" carrier phasor step, while FIG. 7C does not. In an embodiment, the phasor modulation shown in FIG. 5 and FIG. 6, for example, can be created using the four phasor steps shown in FIG. 7C (this was also described above, e.g., in the description of FIG. 7A discussing an example where the carrier phasor step is suppressed). In an embodiment, one or more phasor steps may occur at the carrier frequency, and in an embodiment, some, all, or none of these carrier phasor steps are suppressed.

FIG. 8 illustrates examples of frequency distributions achieved using single layer modulation with various example phasors, according to an embodiment of the present disclosure. In an example embodiment having a dual-layer sensor design, a set of conductive lines (e.g., lines 52 in FIG. 5) of a first mesh layer (that are, e.g., on one side of a substrate) are modulated, while a set of conductive lines of a second mesh layer (that are, e.g., on the other side of the substrate) are not modulated. In an example embodiment having a single-layer sensor design, every other conductive line (e.g., lines 52 in FIG. 6) is modulated (and, e.g., lines 53 are not modulated). Other embodiments using either (or both) single and dual-layer sensor design are contemplated in this disclosure.

FIG. 8 includes four individual graphs 163-166 showing frequency distributions versus amplitude when using phasor modulation. Graph 163 represents the instance where no phasor modulation occurs. Graphs 164-166 represent the instances where example phasors are used in phasor modulation. For instance, the example phasor used in graph 165 of FIG. 8 has the same phasor angle θ (120°) as the phasor depicted in FIG. 7B, and the example phasor used in graph 166 of FIG. 8 has the same phasor angle θ (72°) as the phasor depicted in FIG. 7A.

For each of the graphs 163-166, the thick arrow at 8SP is at the carrier frequency in these examples and, in an embodiment, represents either (1) the sum of the number of conductive lines on the unmodulated layer of a dual-layer design that correspond to a set of modulated conductive lines on the modulated layer or (2) the sum of the number of unmodulated conductive lines of a single-layer design that correspond to a set of modulated conductive lines on the single layer (where, for example, the conductive lines on the single layer alternate between modulated and unmodulated). The carrier frequency represents the horizontal distance between each conductive line in a set of conductive lines of a mesh layer before any phasor modulation occurs. Thus, a carrier frequency of "1SP" would mean that the horizontal distance between each conductive line is substantially 1 sub-pixel pitch. For each of these graphs 163-166, the carrier frequency is 8 sub-pixel pitches, noted as "8SP", which means that the set of conductive lines before being modulated are horizontally spaced at a frequency of 8SP, and thus would have a horizontal separation distance (e.g., 72) of 8 sub-pixel pitches.

For each of graphs 163-166, the thin arrows represent the actual distribution of frequencies that occur under phasor modulation (except for graph 163, where no phasor modulation occurs). Thus, graphs 164-166 show a number of different thin arrows, indicating that phasor modulation creates a number of different frequencies, with each thin arrow at a particular frequency corresponding to a step of the phasor used. The location of each thin arrow along the x axis (frequency measured in sub-pixels) represents a translational shift that occurs as a result of the phasor used in that example of phasor modulation. For example, in graph 164, the arrow at 7.5SP indicates a translational shift of −0.5SP from the carrier frequency 8SP. Conversely, the arrow at 8.5 SP indicates a translational shift of 0.5SP from the carrier frequency. Each pair of thin arrows to the sides of the carrier frequency (e.g. the −0.5SP and 0.5SP arrows of graph 164), and the translational shifts they represent, can be referred to as a "side band" or "sideband." In an embodiment, each side band has a positive component (e.g., representing a translational shift, for example, to the right) and a negative component (e.g., representing a translational shift, for example, to the left), where in an embodiment the absolute value of the shift in each component is substantially the same. In graph 164 and graph 165, there exists one side band (at ±0.5SP). In graph 166, there exist two side bands (one at ±0.5SP, and a second at ±0.31SP). In an embodiment, the number of side bands for a phasor with an odd number of steps is equal to (the number of steps−1)/2. In an embodiment, a side band includes one positive side band component and one negative side band component. In an embodiment, a side band includes multiple positive side band components and multiple negative side band components.

In an embodiment, either (1) a number of conductive lines on the unmodulated layer of a dual-layer design correspond to a set of modulated conductive lines on the modulated layer or (2) a number of unmodulated conductive lines of a single-layer design correspond to a set of modulated conductive lines on the single layer (where, for example, the conductive lines on the single layer alternate between modulated and unmodulated). In these embodiments, for any graph in FIG. 8, the sum of the magnitudes of the thin arrows can, e.g., equal the magnitude of the thick arrow, because, in a dual-layer design, there can be the same (or substantially the same) number of unmodulated conductive lines on the first layer as there are modulated conductive lines on the second layer. In a single-layer design, the magnitudes of the thin arrows can, e.g., equal the magnitude of the thick arrow, because, the conductive lines on the single-layer can alternate between modulated and unmodulated, such that there are the same (or substantially the same) number of unmodulated conductive lines as there are modulated conductive lines. This disclosure contemplated embodiments where the number of modulated and unmodulated conductive lines are not equal.

In an embodiment of a dual-layer touch sensor, a translational pattern (which may also be known as a pattern of translational shifts) is created when a first conductive line of a set of lines of the first mesh is translated by the distance indicated by the leftmost arrow in a graph such as graph 166, the conductive line next to the first conductive line is translated by the distance indicated by the arrow to the right of the leftmost arrow, and the pattern continues until a conductive line is translated by the distance indicated by the rightmost arrow. After this, the pattern repeats for any given number of the conductive lines of the first layer being subjected to phasor modulation. The more phasor steps in the phasor being used (e.g., graph 164 depicts the use of a phasor with two steps, graph 165 depicts the use of a phasor with three steps, and graph 166 depicts the use of a phasor with five steps), the more thin arrows are shown (two, three, and five, respectively), and the more unique translational shifts are completed before the pattern repeats itself. In an embodiment, the pattern may repeat itself immediately, or the pattern may skip a number of conductive lines before repeating itself. In an embodiment, multiple translational patterns (e.g., based on one or more phasors) are implemented on a single set of conductive lines. In an embodiment, a pattern of translational shifts includes a first horizontal component of an at least one positive side band component (e.g., a horizontal distance to shift (or translate) a conductive line based on a positive side band component) and a second horizontal component of an at least one negative side band component (e.g., a horizontal distance to shift (or translate) a conductive line based on a negative side band component). In this embodiment, for example, the positive and negative side band components may relate to a single side band. In an embodiment, a conductive line of the second mesh (in a dual-layer sensor embodiment) is located between each modulated conductive line of the first mesh, such that, viewed from above, the combined conductive lines of the first and second meshes appear to alternate between modulated and unmodulated conductive lines.

In an embodiment of a single-layer touch sensor, a pattern of translational shifts is created in a similar way to the pattern of translational shifts in the dual-layer sensor embodiment described above, except that every other conductive line of a set of conductive lines of the single-layer mesh is modulated and the remaining conductive lines of that set are unmodulated (see, e.g., conductive lines 52 and 53 in FIG. 6). This disclosure contemplates different embodiments of dual-layer and single-layer sensors. For example, different patterns of modulated and unmodulated conductive lines are contemplated, as are embodiments were all lines of a set of conductive lines are modulated.

In an embodiment, the creation of a pattern of translational shifts (created via phasor modulation) also creates a sequence of separation distances (e.g., horizontal separation distances) having corresponding magnitudes between conductive lines (e.g., between conductive lines 52 in FIG. 5 or between conductive lines 52 and 53 in FIG. 6).

The location of each thin arrow on the x axis in graphs 164-166 is determined by calculating the (phasor magnitude)×cos(phasor step $\theta$) for each phasor step and by the carrier frequency. The locations of the thin arrows indicate the different translations of conductive lines from the carrier frequency. In an embodiment, the location of the thin arrows, and thus the amount of translation from the carrier frequency, change according to the particular phasor being used. For example, graph 165 uses a phasor with phasor angle $\theta$=120° and a phasor magnitude of 0.5SP. As described in connection with FIG. 7B, a phasor with an angle $\theta$=120° produces a normalized and reordered set of cos(phasor step $\theta$) values equal to (−1, 0, 1), which is shown in graph 165. When the cos(phasor step $\theta$) values are multiplied by the (phasor magnitude) of 0.5SP to obtain the phasor modulation distances, the phasor modulation distances (also known as the translation distances) become (−0.5SP, 0SP, and 0.5SP). Using these phasor modulation distances to modulate a carrier frequency of 8SP (the specific carrier frequency used in graph 165) results in a set three new frequencies (7.5SP, 8SP, and 8.5SP). The thin arrows represent these new frequencies, which indicate the translation of conductive lines from the carrier frequency according to the phasor steps of the phasor used in graph 165 (i.e., a phasor having an angle $\theta$=120° and a magnitude of 0.5SP).

For each graph in FIG. 8, the carrier frequency is 8SP, so any arrows at 8SP are at the carrier frequency. Any arrow at the carrier frequency corresponds to a phasor modulation distance of zero, and therefore also to a phasor step where the value of cos(phasor step $\theta$) is zero (a carrier phasor step). Any conductive lines that are "translated" according to that "zero" phasor step would not be translated away from the carrier frequency and instead would lay substantially at the carrier frequency.

Graph 163 shows the frequency distribution that occurs when a layer of conductive lines has a spacing at a carrier frequency of 8SP and is not subject to phasor modulation. When no phasor modulation is used, each conductive line is spaced substantially at the carrier frequency (here, at 8 sub-pixel pitches).

Graph 164 shows the frequency distribution that occurs when a layer of conductive lines has a spacing at a carrier frequency of 8SP and is modulated by a phasor having a phasor angle $\theta$=180° and a phasor magnitude of 0.5SP.

Graph 165 shows the frequency distribution that occurs when a layer of conductive lines has a spacing at a carrier frequency of 8SP and is modulated by a phasor having a phasor angle $\theta$=120° and a phasor magnitude of 0.5SP.

Graph 166 shows the frequency distribution that occurs when a layer of conductive lines has a spacing at a carrier frequency of 8SP and is modulated by a phasor having a phasor angle $\theta$=72° and a phasor magnitude of 0.5SP.

FIG. 9 illustrates examples of frequency distributions achieved using single layer modulation with various example phasors and suppressed carriers, according to an embodiment of the present disclosure. FIG. 9 is the same as FIG. 8 (for example, graph 163 corresponds to graph 173, graph 164 corresponds to graph 174, graph 165 corresponds to graph 175, and graph 166 corresponds to graph 176), except the carrier phasor steps (those that produce a phasor modulation distance equal to zero and thus result in no translational shift away from the carrier frequency) are dropped, or "suppressed." This is shown in FIG. 9 as the absence of a thin arrow at 8SP (the carrier frequency in this example) for each of graphs 174-176. Graph 173 is not changed from graph 163 in FIG. 8 because it represents the situation where no phasor modulation occurs (i.e., all conductive lines are at the carrier frequency, which is at 8SP intervals in this example).

In an embodiment, by removing the carrier phasor step, the number of phasor steps in the set decreases. For example, in graph 176, the set of numbers (−1, −0.62, 0, 0.62, 1) represent the normalized and reordered cos(phasor step $\theta$) values described in connection with FIG. 7A. As previously noted, the cos(phasor step $\theta$)×(phase magnitude)=phasor modulation distance (which is also known as the translation distance). In FIG. 9, the phasor step that produces the "0" value in the set of (−1, −0.62, 0, 0.62, 1) is dropped (as shown in FIG. 7C), effectively reducing the set from five values (−1, −0.62, 0, 0.62, 1) to four values (−1, −0.62, 0.62, 1). This means that the new set of cos(phasor step $\theta$) values (based on only four phasor steps) are used to produce phasor modulation (a series of translational shifts in a layer of conductive wires). Thus, when the carrier phasor step is suppressed, all modulated conductive lines in a single layer are translated away from the carrier frequency because the "0" cos(phasor step $\theta$) value is suppressed. Alternatively, if the carrier phasor step(s) were not suppressed, the "0" value would remain and one in five of the modulated conductive lines would not be translated (because the conductive lines modulated by the "0" value would not be translated—the phasor modulation distance would equal zero). These untranslated conductive lines would lay substantially at the carrier frequency (8SP in this example). In an embodiment, suppressing the carrier phasor steps can result in reduced low frequency moiré effects compared to not suppressing the carrier phasor steps.

An example of an implementation suppressing a carrier phasor step is shown in FIG. 5 and FIG. 6. FIG. 5 and FIG. 6 show examples of the use of phasor modulation where the phasor has five steps, but where the one phasor step at the carrier frequency is suppressed, resulting in the use of four phasor steps to create four phasor modulation distances 140a-140d. Thus, the four phasor modulation distances 140a-140d shown in FIG. 5 are non-zero and result in the translation of conductive lines 52a-52d (which begin to repeat at conductive line 52e) away from the original conductive lines 52a-d (represented by the solid black lines) to the modulated conductive lines 52a-d (represented by the dashed lines to the left of right of the solid black lines). If the carrier phasor step were not suppressed, one of the conductive lines 52a-52e would not be translated (its phasor modulation distance would equal zero), and the pattern would repeat every five modulated conductive lines instead of every four modulated conductive lines.

Figure 10:
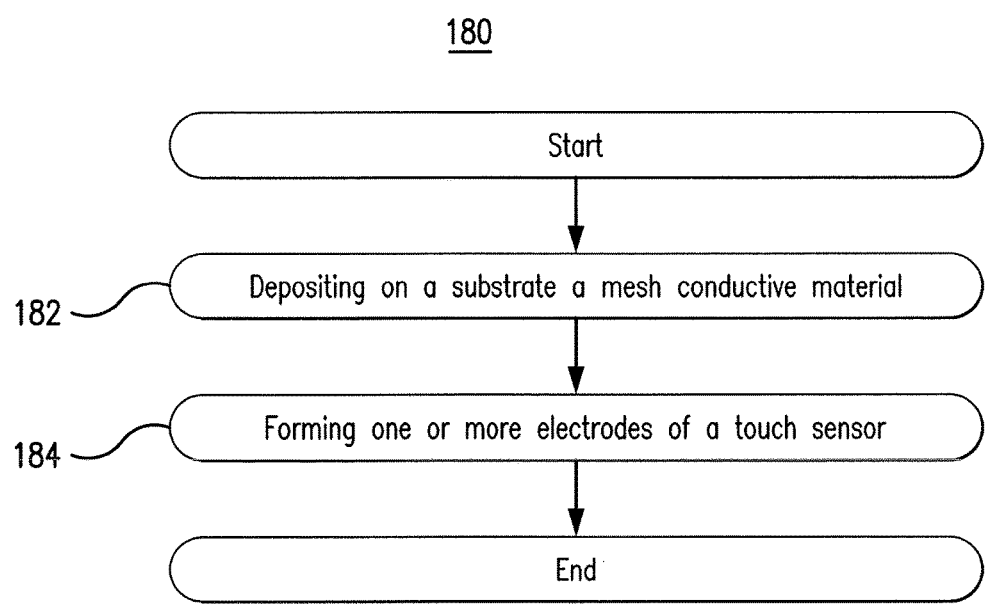
FIG. 10 illustrates an example method for forming one or more electrodes of a touch sensor, according to an embodiment of the present disclosure.

FIG. 10 illustrates an example method 180 for forming one or more electrodes of a touch sensor, according to an embodiment of the present disclosure. The method starts at step 182 where a mesh of conductive material is deposited on a substrate. This disclosure contemplates any technique for depositing a mesh of conductive material on a substrate, such as for example, printing of a mesh onto a substrate, evaporation, sputtering, physical vapor deposition, or chemical vapor deposition. In an embodiment, the mesh of conductive material is configured to extend across a display that includes multiple pixels 22. In an embodiment, the mesh includes first lines of conductive material 50 that are substantially parallel to each other and second lines of conductive material 52 that are substantially parallel to each other. In an embodiment, the first and second lines are configured to extend across the display at first and second angles 54 and 56, respectively, where the angles are determined in any manner. In an embodiment, the first and second lines each have respective separation distances 70 and 72 that are determined in any manner, such as by any of the above-described manners. As an example, the first (and/or second) lines of conductive material 50 (and/or 52) are modulated according to any phasor modulation technique described herein, such that separation distance 70 (and/or 72) may not be substantially constant between all sets of adjacent first (and/or second) lines. In this example, the separation distance 70 (and/or 72) between adjacent lines may vary (for example, according to a cyclical repeating pattern of separation distances), due to the use of a phasor modulation technique. In an embodiment, one or more mesh layers may be created in single-layer, dual-layer, or other multi-layer touch sensors.

At step 184, one or more electrodes of a touch sensor are formed from the mesh of conductive material, at which point the method ends. This disclosure contemplates any technique for forming electrodes from a mesh of conductive material, such as for example, by etching, cutting, or ablating to remove one or more portions of the mesh of conductive material. Although this disclosure describes and illustrates particular steps of the method of FIG. 10 as occurring in a particular order, this disclosure contemplates any steps of the method of FIG. 10 occurring in any order. An embodiment can repeat or omit one or more steps of the method of FIG. 10. Moreover, although this disclosure describes and illustrates an example method for forming electrodes of a touch sensor including the particular steps of the method of FIG. 10, this disclosure contemplates any method for forming electrodes of a touch sensor including any steps, which can include all, some, or none of the steps of the method of FIG. 11. Moreover, although this disclosure describes and illustrates particular components carrying out particular steps of the method of FIG. 10, this disclosure contemplates any combination of any components carrying out any steps of the method of FIG. 10.

Figure 11:
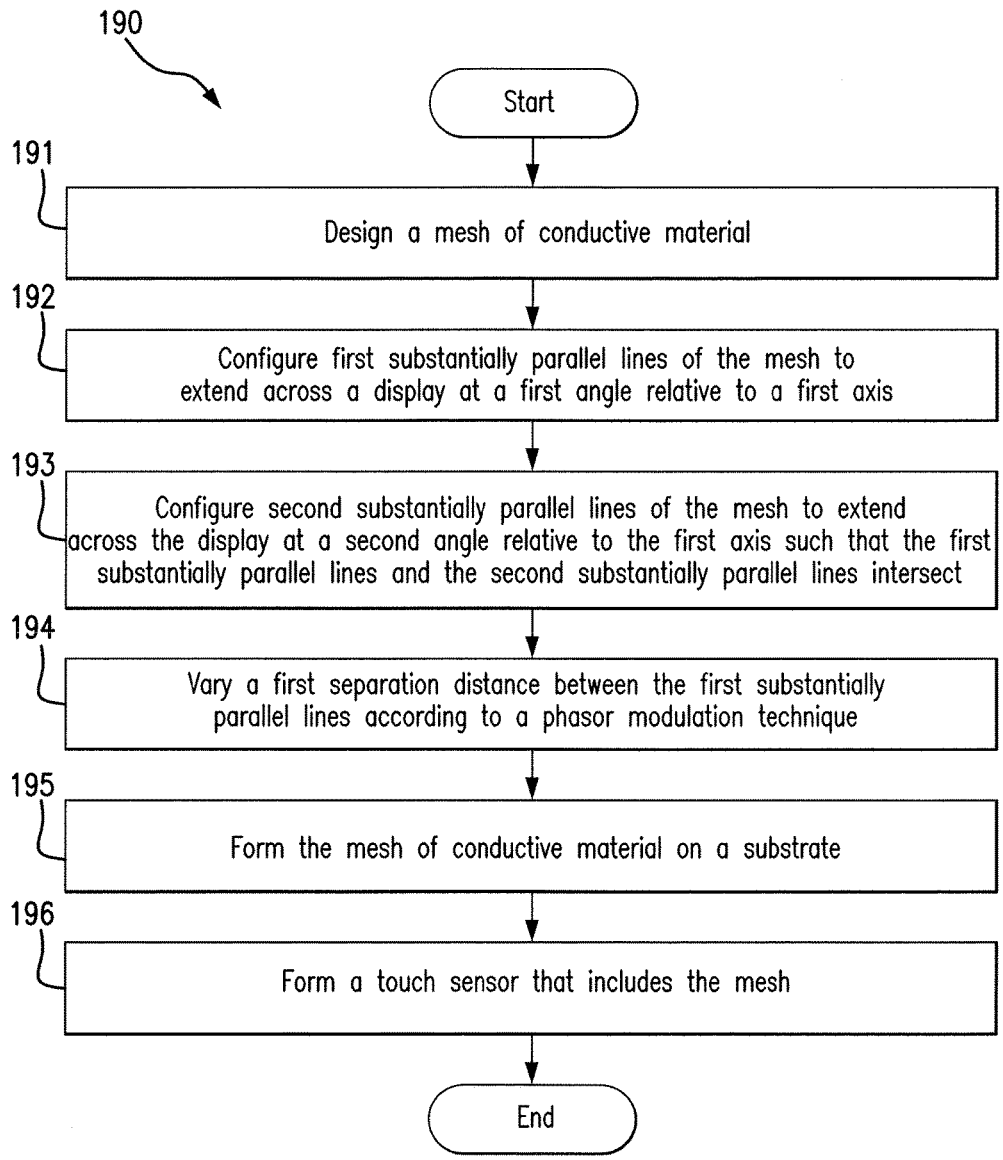
FIG. 11 illustrates an example method for forming one or more touch sensors, according to an embodiment of the present disclosure.

FIG. 11 illustrates an example method 190 for forming one or more touch sensors, according to an embodiment of the present disclosure. The method starts at step 191, where a mesh of conductive material is designed. In an embodiment, the mesh of conductive material is designed as having first lines of conductive material that are substantially parallel to each other and have a first separation distance between the first lines, and second lines of conductive material that are substantially parallel to each other and have a second separation distance between the second lines. In an embodiment, the first lines that are adjacent to each other are separated from each other along the first axis (e.g., horizontal axis 28) by a first separation distance. In an embodiment, the second lines that are adjacent to each other are separated from each other along the first axis (e.g., horizontal axis 28) by a second separation distance. In an embodiment, the mesh includes first lines of conductive material 50 that are substantially parallel to each other and second lines of conductive material (e.g., 52 in the example of FIG. 5, or 52 and 53 in the example of FIG. 6) that are substantially parallel to each other. In an embodiment, the first and second lines each have respective separation distances (e.g., 70 and 72 in FIG. 5) that are determined in any manner, such as by any of the above-described manners.

Steps 192, 193, and 194 further describe how the mesh is designed, according to an example embodiment of the present disclosure. At step 192, first substantially parallel lines of the mesh are configured to extend across a display, or at least a portion of a display, at a first angle relative to a first axis. In an embodiment, the first substantially parallel lines are the first lines discussed above in step 191. In an embodiment, the first lines are configured to extend across a display, or at least a portion of a display, (e.g., display portion 20) at first angle 54, where the first angle is determined in any manner. In an embodiment, the first axis is horizontal axis 28.

At step 193, second substantially parallel lines of the mesh are configured to extend across the display, or at least a portion of a display, at a second angle relative to the first axis such that the first lines and the second lines intersect. In an embodiment, the second substantially parallel lines are the second lines discussed above in step 191. In an embodiment, the second lines are configured to extend across the display, or at least a portion of a display, (e.g., display portion 20) at second angle 56, where the second angle is determined in any manner. In an embodiment, the first axis is horizontal axis 28. In another embodiment, the first axis is vertical axis 32. In an embodiment, the first and second lines intersect because the first and second angles, relative to the first axis, are not equivalent (in both magnitude and orientation).

At step 194, a first separation distance between the first substantially parallel lines is varied according to a phasor modulation technique. This disclosure contemplates the use of any phasor modulation technique, for example, those described or referred to above. In an embodiment, the first separation distance is the first separation distance discussed above in step 191. In an embodiment, a second separation distance between the second lines (such as the second separation distance discussed above in step 191) is also varied (or is varied instead of the first separation distance) according to a second phasor modulation technique that is substantially the same as the phasor modulation technique associated with the first lines. In an embodiment, the second separation distance between the second lines is also varied according to a second phasor modulation technique that is not substantially the same as the phasor modulation technique associated with the first lines. In an embodiment, the first lines have respective separation distance 70 that is determined using a phasor modulation technique. In another embodiment, the second separation distance between the second lines is varied according to a phasor modulation technique, and the first separation distance is not.

As an example, the first (and/or second) lines of conductive material (e.g., 50, 52, or 52 and 53) are modulated according to any phasor modulation technique described herein, such that separation distance (e.g., 70 and/or 72, or, for example, the separation distance between lines 52 and 53 in FIG. 6) may not be substantially constant between all sets of adjacent first lines and/or adjacent second lines (e.g., at least some of the magnitudes of the separation distances may be different). In this example, the separation distance (e.g., 70 and/or 72 in FIG. 5) between lines may vary (for example, according to a cyclical repeating pattern of separation distances) due to the use of a phasor modulation technique (e.g., as discussed above regarding FIGS. 5-9). As an example, the first lines (e.g., the first lines discussed above in step 191) are separated from each other along the first axis by a sequence of separation distances having corresponding magnitudes (e.g., a pattern or part of a pattern of certain separation distances), and the magnitudes of more than one separation distance from among the sequence of separation distances are based on a phasor step θ and a phasor magnitude of at least one phasor. Furthermore, in an example, the magnitudes of more than one separation distance from among the sequence of separation distances are further based on a phasor having at least one carrier phasor step and at least one side band comprising at least one positive side band component and at least one negative side band component. In addition, as an example the magnitudes of more than one separation distance from among the sequence of separation distances comprise a pattern of translational shifts comprising a first horizontal component of the at least one positive side band component and a second horizontal component of the at least one negative side band component. In an embodiment, the pattern of translational shifts is applied to adjacent first lines. In another embodiment, the pattern of translational shifts is applied to every other conductive line of the first lines. These embodiments, and any other steps and embodiments of method 190, can be applicable to single-layer, dual-layer, or other multi-layer touch sensor embodiments having one or more meshes of conductive material.

At step 195, the mesh of conductive material is formed on a substrate. This disclosure contemplates any technique for forming the mesh, which can be formed on any substrate. In an embodiment, the mesh is configured to extend across a display, or at least a portion of a display, (e.g., display portion 20). In an embodiment, the mesh is designed according to some or all of the previous steps of the method of FIG. 11. In an embodiment, additional techniques are be used before, concurrently, and/or after some or all of a phasor modulation technique is used. For example, randomizing the spacing of some or all of the first lines and/or the second lines, slightly modifying the shape of some or all of the first lines and or second lines (e.g., slightly curving some or all of the lines according to a sinusoidal function or any other function), or any other techniques may be used.

At step 196, a touch sensor is formed that includes the mesh. This disclosure contemplates any technique for forming the touch sensor. In an embodiment, the touch sensor is configured to extend across a display, or at least a portion of a display, (e.g., display portion 20). In an embodiment, the touch sensor includes a mesh that is designed according to some or all of the previous steps of the method of FIG. 11.

Although this disclosure describes and illustrates particular steps of the method of FIG. 11 as occurring in a particular order, this disclosure contemplates any steps of the method of FIG. 11 occurring in any order. An embodiment can repeat or omit one or more steps of the method of FIG. 11. In an embodiment, some or all of the steps of the method of FIG. 10 can include or replace some or all of the steps of the method of FIG. 11. In an embodiment, some or all of the steps of the method of FIG. 11 can include or replace some or all of the steps of the method of FIG. 10. Moreover, although this disclosure describes and illustrates particular components carrying out particular steps of the method of FIG. 11, this disclosure contemplates any combination of any components carrying out any steps of the method of FIG. 11.

Figure 12:
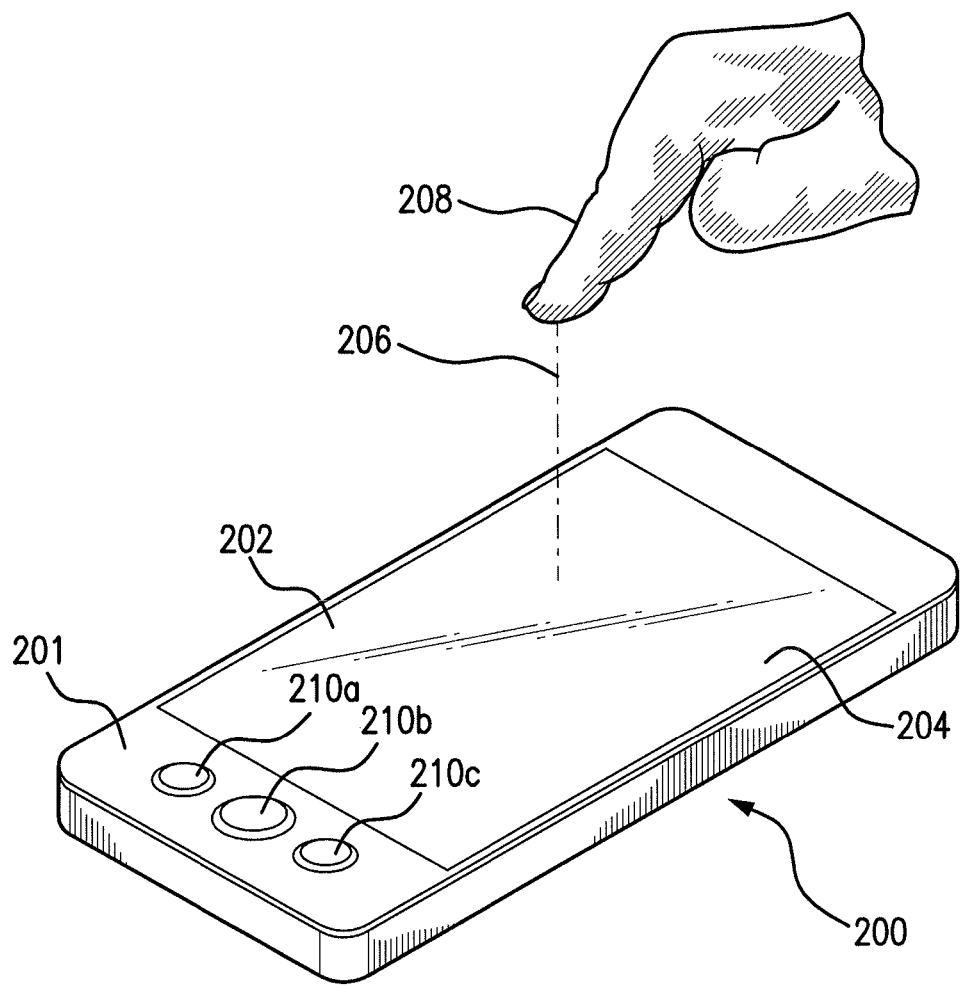
FIG. 12 illustrates an example computer system, according to an embodiment of the present disclosure.

FIG. 12 illustrates an example computer system (e.g., device 200), according to an embodiment of the present disclosure. In an embodiment, device 200 is any personal digital assistant, cellular telephone, smartphone, tablet computer, and the like. In one embodiment, device 200 includes other types of devices, such as automatic teller machines (ATMs), home appliances, personal computers, and any other such device having a touch screen. In the illustrated example, components of system 100 are internal to device 200. Although this disclosure describes a particular device 200 having a particular implementation with particular components, this disclosure contemplates any device 200 having any implementation with any components.

A particular example of device 200 is a smartphone that includes a housing 201 and a touch screen display 202 occupying a portion of a surface 204 of housing 201 of device 200. In an embodiment, housing 201 is an enclosure of device 200, which contains internal components (e.g., internal electrical components) of device 200. In an embodiment, touch sensor 11 is coupled, directly or indirectly, to housing 201 of device 200. In an embodiment, touch screen display 202 occupies a portion or all of a surface 204 (e.g., one of the largest surfaces 204) of housing 201 of device 200. Reference to a touch screen display 202 includes cover layers that overlay the actual display and touch sensor elements of device 200, including a top cover layer (e.g., a glass cover layer). In the illustrated example, surface 204 is a surface of the top cover layer of touch screen display 202. In an embodiment, the top cover layer (e.g., a glass cover layer) of touch screen display 200 is considered part of housing 201 of device 200.

In one embodiment, the size of touch screen display 202 allows the touch screen display 202 to present a wide variety of data, including a keyboard, a numeric keypad, program or application icons, and various other interfaces. In one embodiment, a user interacts with device 200 by touching touch screen display 202 with a stylus, a finger, or any other object in order to interact with device 200 (e.g., select a program for execution or to type a letter on a keyboard displayed on the touch screen display 202). In one embodiment, a user interacts with device 200 using multiple touches to perform various operations, such as to zoom in or zoom out when viewing a document or image. In some embodiments, such as home appliances, touch screen display 202 recognizes only single touches.

In an embodiment, users interact with device 200 by physically impacting surface 204 (or another surface) of housing 201 of device 200, shown as impact 206, or coming within a detection distance of touch sensor 11 using an object 208, such as, for example, one or more fingers, one or more styluses, or other objects. In one embodiment, surface 204 is a cover layer that overlies touch sensor array 12 and a display of device 200.

Device 200 includes buttons 210, which when pressed, in an example embodiment, cause a processor to perform any function in relation to the operation of device 200. As an example, one or more of buttons 210 (e.g., button 210b) may operate as a so-called "home button" that, at least in part, indicates to device 200 that a user is preparing to provide input to touch sensor 11 of device 200.

Herein, reference to a computer-readable non-transitory storage medium or media can include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other computer-readable non-transitory storage medium or media, or any combination of two or more of these. A computer-readable non-transitory storage medium or media can be volatile, non-volatile, or a combination of volatile and non-volatile.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensor, comprising:
   a substrate; and
   a mesh of conductive material formed on the substrate and configured to extend across a display, wherein:
   the mesh of conductive material comprises first lines of conductive material that are substantially parallel to each other;
   the first lines are configured to extend across at least a portion of the display at a first angle relative to a first axis;
   the first lines are separated from each other along the first axis by a sequence of separation distances having corresponding magnitudes;
   the corresponding magnitudes of more than one of the separation distances from among the sequence of separation distances are based on a phasor step $\theta$ and a phasor magnitude of at least one phasor;
   the corresponding magnitudes of more than one of the separation distances from among the sequence of separation distances are further based on a phasor having at least one carrier phasor step and at least one side band comprising at least one positive side band component and at least one negative side band component; and
   the corresponding magnitudes of more than one of the separation distances from among the sequence of separation distances comprise a pattern of translational shifts comprising a first horizontal component of the at least one positive side band component and a second horizontal component of the at least one negative side band component.

2. The touch sensor of claim 1,
   wherein:
   the first lines are adjacent to one another; and
   the pattern of translational shifts is applied to adjacent first lines.

3. The touch sensor of claim 1, wherein the pattern of translational shifts is applied to every other conductive line of the first lines.

4. The touch sensor of claim 1, wherein the phasor includes an odd number of phasor steps and the pattern of translational shifts excludes the translational shift associated with at the at least one carrier phasor step.

5. The touch sensor of claim 1, wherein:
   the phasor further comprises a phasor magnitude having a value of less than one sub-pixel pitch, equal to one sub-pixel pitch, or greater than one sub-pixel pitch; and
   the pattern of translational shifts is:
   normalized to one;
   multiplied by the phasor magnitude; and
   applied to the first lines.

6. The touch sensor of claim 1, wherein the pattern of translational shifts consists of about −1, about −0.62, about 0.62, and about 1.

7. The touch sensor of claim 1, wherein:
   the display comprises a plurality of pixels;
   each of the pixels has a first pixel pitch ($PP_x$) along the first axis;
   the first pixel pitch is a distance between corresponding features of two adjacent pixels along the first axis; and
   the magnitudes of more than one separation distance from among the sequence of separation distances are based on the first pixel pitch, the phasor step $\theta$, and the phasor magnitude of the at least one phasor.

8. A system comprising:
   a display device comprising a plurality of pixels, each pixel including a plurality of sub-pixels; and
   a touch sensor that comprises a substrate and a mesh of conductive material formed on the substrate and configured to extend across the display device, wherein:
   the mesh of conductive material comprises first lines of conductive material that are substantially parallel to each other;
   the first lines are configured to extend across at least a portion of the display device at a first angle relative to a first axis;
   the first lines are separated from each other along the first axis by a sequence of separation distances having different magnitudes;
   the corresponding magnitudes of more than one of the separation distances from among the sequence of separation distances are based on a phasor step $\theta$ and a phasor magnitude of at least one phasor;
   the corresponding magnitudes of more than one of the separation distances from among the sequence of separation distances are further based on a phasor having at least one carrier phasor step and at least one side band comprising at least one positive side band component and at least one negative side band component; and the corresponding magnitudes of more than one of the separation distances from among the sequence of separation distances comprise a pattern of translational shifts comprising a first horizontal component of the at least one positive side band component and a second horizontal component of the at least one negative side band component.

9. The system of claim 8, wherein:

the first lines are adjacent to one another; and the pattern of translational shifts is applied to adjacent first lines.

10. The system of claim 8, wherein the pattern of translational shifts is applied to every other conductive line of the first lines.

11. The system of claim 8, wherein the phasor includes an odd number of phasor steps and the pattern of translational shifts excludes the translational shift associated with the at the at least one carrier phasor step.

12. The system of claim 8, wherein:

the phasor further comprises a phasor magnitude having a value of less than one sub-pixel pitch, equal to one sub-pixel pitch, or greater than one sub-pixel pitch; and the pattern of translational shifts is:

normalized to one;

multiplied by the phasor magnitude; and applied to the first lines.

13. The system of claim 8, wherein the pattern of translational shifts consists of about −1, about −0.62, about 0.62, and about 1.

14. The system of claim 8, wherein:

the display device comprises a plurality of pixels;

each of the pixels has a first pixel pitch ($PP_x$) along the first axis;

the first pixel pitch is a distance between corresponding features of two adjacent pixels along the first axis; and the magnitudes of more than one separation distances from among the sequence of separation distances are based on the first pixel pitch, the phasor step $\theta$, and the phasor magnitude of the at least one phasor.

15. A method, comprising:

forming a touch sensor that comprises a substrate and a mesh of conductive material formed on the substrate and configured to extend across a display, wherein:

the mesh of conductive material comprises first lines of conductive material that are substantially parallel to each other;

the first lines are configured to extend across at least a portion of the display at a first angle relative to a first axis;

the first lines are separated from each other along the first axis by a sequence of separation distances having corresponding magnitudes;

the corresponding magnitudes of more than one of the separation distances from among the sequence of separation distances are based on a phasor step $\theta$ and a phasor magnitude of at least one phasor;

the corresponding magnitudes of more than one of the separation distances from among the sequence of separation distances are further based on a phasor having at least one carrier phasor step and at least one side band comprising at least one positive side band component and at least one negative side band component; and the corresponding magnitudes of more than one of the separation distances from among the sequence of separation distances comprise a pattern of translational shifts comprising a first horizontal component of the at least one positive side band component and a second horizontal component of the at least one negative side band component.

16. The method of claim 15, wherein:

the first lines are adjacent to one another; and the pattern of translational shifts is applied to adjacent first lines.

17. The method of claim 15, wherein the pattern of translational shifts is applied to every other conductive line of the first lines.

* * * * *